United States Patent
Hatakeyama et al.

(10) Patent No.: US 10,800,916 B2
(45) Date of Patent: Oct. 13, 2020

(54) STRETCHABLE FILM COMPOSITION, STRETCHABLE FILM, AND METHOD FOR FORMING THE SAME

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP); Shiori Nonaka, Joetsu (JP); Koji Hasegawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 17 days.

(21) Appl. No.: 16/260,494

(22) Filed: Jan. 29, 2019

(65) Prior Publication Data

US 2019/0241709 A1 Aug. 8, 2019

(30) Foreign Application Priority Data

Feb. 8, 2018 (JP) .................................. 2018-21374

(51) Int. Cl.
| | |
|---|---|
| *C08L 75/16* | (2006.01) |
| *C08J 5/18* | (2006.01) |
| *C08J 3/28* | (2006.01) |
| *C08L 75/04* | (2006.01) |
| *C09D 183/10* | (2006.01) |

(Continued)

(52) U.S. Cl.
CPC .......... *C08L 75/16* (2013.01); *C08G 18/3893* (2013.01); *C08G 18/44* (2013.01); *C08G 18/4854* (2013.01); *C08G 18/4887* (2013.01); *C08G 18/672* (2013.01); *C08G 18/755* (2013.01); *C08G 18/758* (2013.01); *C08G 77/458* (2013.01); *C08J 3/28* (2013.01); *C08J 5/18* (2013.01); *C08L 75/04* (2013.01); *C08L 83/10* (2013.01); *C09D 183/10* (2013.01); *C08G 18/61* (2013.01); *C08L 2203/16* (2013.01); *C08L 2203/206* (2013.01)

(58) Field of Classification Search
CPC ................ C09D 183/08; C09D 183/10; C08G 18/3893; C08G 18/5906; C08G 77/458
See application file for complete search history.

(56) References Cited

FOREIGN PATENT DOCUMENTS

| JP | 09-012662 A | * | 1/1997 |
|---|---|---|---|
| JP | 2001-018329 A | | 1/2001 |

(Continued)

OTHER PUBLICATIONS

"Effect of Different Polyethers on Surface and Thermal Properties of Poly(urethane-siloxane) Copolymers Modified with Side-chain Siloxane" authored by Bycziynski and published in the Journal of Thermal Analysis and Calorimetry (2013) 114:397-408.*

(Continued)

*Primary Examiner* — Marc S Zimmer
(74) *Attorney, Agent, or Firm* — Oliff PLC

(57) ABSTRACT

The present invention is a stretchable film composition including: a silicone main-chain type urethane having a structure shown by the following general formula (1)-1 and/or (1)-2, and a silicone-pendant type urethane having a structure shown by the following general formula (2)-1 and/or (2)-2. The present invention provides a stretchable film composition that has excellent stretchability and strength, with the film surface having excellent water repellency, and is favorably used for a non-tackiness stretchable film, a stretchable film using the stretchable film composition, and a method for forming the same.

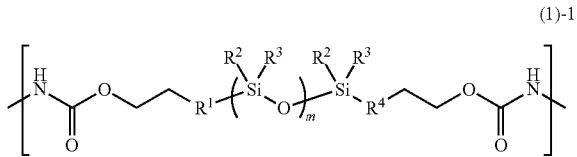

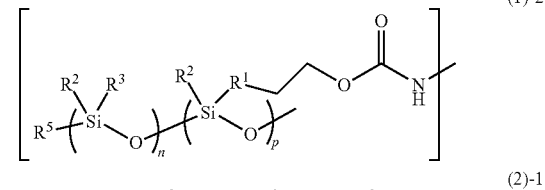

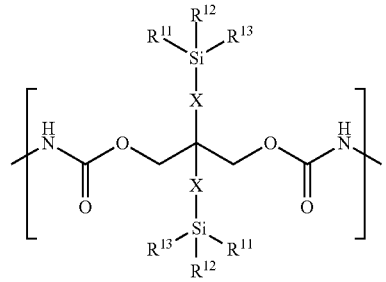

19 Claims, 3 Drawing Sheets

(51) Int. Cl.
*C08G 77/458* (2006.01)
*C08G 18/48* (2006.01)
*C08G 18/75* (2006.01)
*C08G 18/38* (2006.01)
*C08G 18/67* (2006.01)
*C08G 18/44* (2006.01)
*C08L 83/10* (2006.01)
C08G 18/61 (2006.01)

(56) References Cited

FOREIGN PATENT DOCUMENTS

JP 2004-033468 A 2/2004
JP 2012-152725 A 8/2012

OTHER PUBLICATIONS

Machine-generated translation of JP 09-012662 into English (no date).*

* cited by examiner

STRETCHABLE FILM COMPOSITION, STRETCHABLE FILM, AND METHOD FOR FORMING THE SAME

TECHNICAL FIELD

The present invention relates to a stretchable film composition and a stretchable film that combine stretchability, strength, water repellency, and non-tackiness, together with a method for forming the same.

BACKGROUND ART

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the human body of users to constantly monitor the state of physical conditions. The wearable device normally includes a bio-electrode for detecting an electric signal transmitted from a body, wires for sending the electric signal to a sensor, a semiconductor chip serving as a sensor, and a battery, as well as an adhesive pad to be attached to the skin. Patent Document 1 describes detailed structures of a bio-electrode, a wiring part surrounding the bio-electrode, and an adhesive pad. The wearable device disclosed in Patent Document 1 includes a bio-electrode, a silicone-based adhesive film disposed around the bio-electrode, a sensor device, and a meandering-shaped stretchable silver wiring part coated with a stretchable urethane film between the bio-electrode and the sensor device.

The urethane film has high stretchability and strength, and excellent mechanical properties as a film coated on a stretchable wiring part. Unfortunately, the hydrolysis inherent in the urethane film lowers its stretchability and strength, while the silicone film has no such hydrolysis, but the strength inherently remains low.

The use of silicone urethane polymers, whose main chain has both a urethane bond and a siloxane bond, has been examined. Advantageously, cured products of the silicone urethane polymer are characterized by higher strength than single silicone and lower hydrolysis than single polyurethane. Such cured products unfortunately fail to achieve the strength equivalent to single polyurethane and the water repellency equivalent to single silicone, and the strength and water repellency are in-betweens of those inherent in silicone and polyurethane.

Highly stretchable urethane films tend to have a sticky surface to the touch. The sticky surface causes difficulty in separating films that are put together and failure in printing since the film is stuck to a printing plate when screen printing is performed on this film. On the other hand, silicone films have high release characteristics and are prevented from sticking with each other thereby. However, due to the lower strength of silicone, thin silicone films easily break in stretching. When screen printing is performed on a silicone film, failure in printing due to sticking with a printing plate can be avoided, but the lower adhesion to ink causes peeling off of the cured ink. This comes from high release characteristics of a silicone surface. On the other hand, urethane films have higher adhesion to ink and are prevented from peeling off of the cured ink.

Films using polyurethane with a silicone pendant have well balanced stretchability, strength, and water repellency, but have drawbacks of mutual sticking of the films or sticking to a printing plate in screen printing due to sticking of the film surface. In a film based on polyurethane having a main chain of a silicone block copolymer, the film surface is free from sticking, but the strength is poor.

Accordingly, it is desirable to develop a stretchable film having higher stretchability and strength without causing sticking of the surface, on which screen printing and so on can be performed without peeling off of the printed ink.

A skin sheet material for a bicycle is proposed, having a surface coated with a silicone-urethane film, a urethane film on the inside, and a polyolefin elastomer interior (Patent Document 2). With the silicone-urethane film at the outermost surface, the wear resistance is improved. Having lower surface energy, silicone is free from sticking, which improves the wear resistance.

CITATION LIST

Patent Literature

Patent Document 1: Japanese Patent Laid-Open Publication No. 2004-033468

Patent Document 2: Japanese Patent Laid-Open Publication No. 2001-18329

SUMMARY OF THE INVENTION

Technical Problem

Due to these backgrounds, it has been demanded to develop a self-standing stretchable film having excellent stretchability and strength that are equivalent to polyurethane as well as excellent water repellency that is equivalent to silicone without causing mutual sticking of the films, and a method for forming the same.

In view of the circumstances, the present invention aims to provide a stretchable film composition that has excellent stretchability and strength, with the film surface having excellent water repellency, and is favorably used for a non-tackiness stretchable film, a stretchable film using the stretchable film composition, and a method for forming the same.

Solution to Problem

To solve the problems, the present invention provides a stretchable film composition comprising:

a silicone main-chain type urethane having a structure shown by the following general formula (1)-1 and/or (1)-2, and a silicone-pendant type urethane having a structure shown by the following general formula (2)-1 and/or (2)-2:

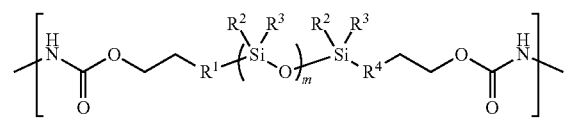

(1)-1

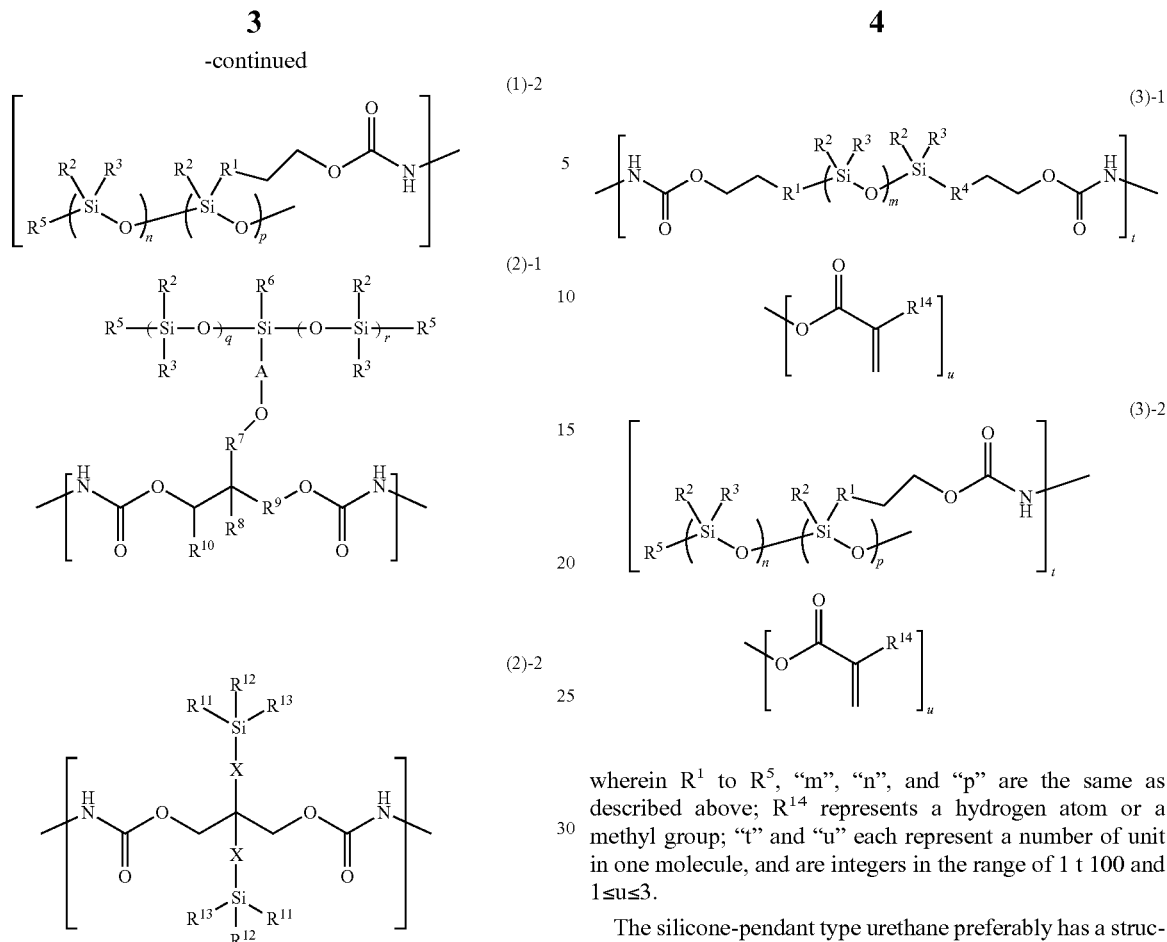

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a $-(OSiR^2R^3)_s-$ $OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

The inventive stretchable film composition is excellent in stretchability, strength, and water repellency on the film surface to be favorably used for a non-tackiness stretchable film.

The silicone main-chain type urethane preferably has a structure containing a (meth)acrylate group at a terminal thereof shown by the following general formula (3)-1 and/or (3)-2:

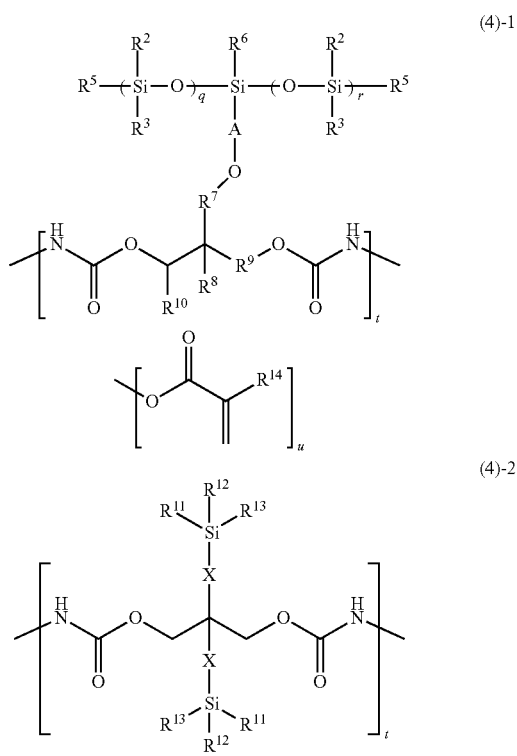

wherein $R^1$ to $R^5$, "m", "n", and "p" are the same as described above; $R^{14}$ represents a hydrogen atom or a methyl group; "t" and "u" each represent a number of unit in one molecule, and are integers in the range of 1 t 100 and 1≤u≤3.

The silicone-pendant type urethane preferably has a structure containing a (meth)acrylate group at a terminal thereof shown by the following general formula (4)-1 and/or (4)-2:

-continued

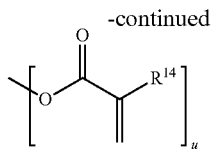

wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

With a structure having a (meth)acrylate group at the terminal like this, the stretchable film composition can be favorably used for a stretchable film that has excellent stretchability, strength, and water repellency on the film surface.

It is preferable that the silicone main-chain type urethane be contained in a ratio of 50 mass % or less based on the silicone-pendant type urethane.

It is preferable that the silicone main-chain type urethane be contained in a ratio of 25 mass % or less based on the silicone-pendant type urethane.

It is preferable that the silicone main-chain type urethane be contained in a ratio of 15 mass % or less based on the silicone-pendant type urethane.

With such a content ratio of the silicone main-chain type urethane, the composition can be favorably used for a stretchable film having particularly excellent strength.

The present invention also provides a stretchable film comprising a cured material of the stretchable film composition described above, wherein the silicone main-chain type urethane is oriented to a surface of the stretchable film.

The inventive stretchable film has excellent stretchability and strength, with the film surface having excellent water repellency, and is a non-tackiness stretchable film.

It is preferable that the stretchable film have a stretching property of 20 to 1000% in a tensile test regulated by JIS K 6251.

With such a stretching property, the stretchable film can be particularly preferably used as a coating film of a stretchable wiring.

The stretchable film is preferably used as a film to be in contact with a conductive wiring having stretchability. The inventive stretchable film is particularly suitable for such a use.

The present invention also provides a method for forming a stretchable film comprising:

forming a film from the stretchable film composition described above, and then, curing the film by heating and/or light exposure.

The method for forming a stretchable film like this makes it possible to easily form a stretchable film with non-tackiness that is excellent in stretchability, strength, and water repellency on the film surface.

Advantageous Effects of Invention

As described above, the stretchable film of the present invention has excellent stretchability and strength that are equivalent to polyurethane, and the film surface is excellent in water repellency and free from sticking equivalently to or superiorly to silicone having a main chain of a siloxane bond, thereby being a non-tackiness stretchable film. All the properties of higher strength, higher stretching, higher water repellency, and non-tackiness can be satisfied if it is possible to form a film in which the film interior is polyurethane having a silicone-pendant, and the film surface is polyurethane with the main-chain being silicone block copolymer. The inventive stretchable film composition is characterized by blending a silicone main-chain type urethane and a silicone-pendant type urethane. When this composition is applied, the silicone main-chain type urethane segregates or orients to the surface of the film. This can be cured to form a film with the surface being coated with the silicone main-chain type urethane. Accordingly, the stretchable film of the present invention can be used particularly desirably as a stretchable film that is capable of mounting not only a wiring part for connecting a bio-electrode and a sensor but also all of such a bio-electrode and sensor, and a cover film to coat a sensor or wiring, in a wearable device.

DESCRIPTION OF EMBODIMENTS

Figure 1:
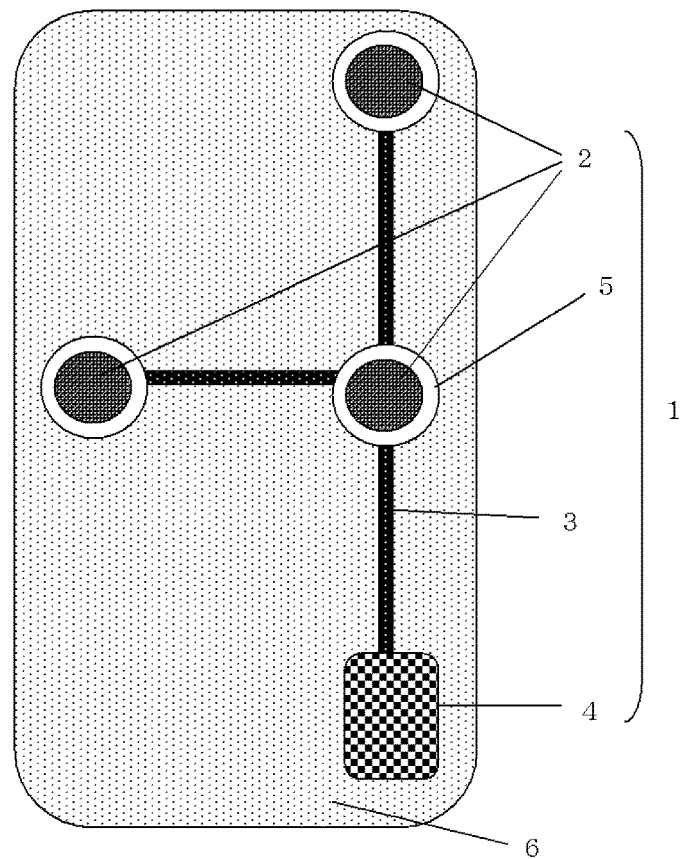
FIG. 1 is a schematic illustration of an electrocardiograph formed on a stretchable film of the present invention viewed from a bio-electrode side.

Polyurethane has sufficient stretchability and strength, but unfortunately the water repellency is low and the strength and stretchability are low due to hydrolysis. Also, another drawback is that silicone has higher water repellency, but lower strength. In a cured product of a silicone urethane polymer having the both of a urethane bond and a siloxane bond in the main chain, there is a drawback of lower strength though the surface has excellent water repellency and hardly has stickiness. A film based on urethane having a silicone-pendant side chain has a drawback of surface stickiness though it has higher strength, higher stretchability, and higher water repellency. Under the circumstances, it has been desired to develop a stretchable film composition that can be favorably used for a stretchable film having excellent stretchability and strength that are equivalent to polyurethane, with the film surface having sufficiently higher strength as well as excellent water repellency and non-tackiness that are equivalent to or superior to those of silicone; a stretchable film using the stretchable film composition, and a method for forming the same.

Accordingly, the present inventors have diligently investigated to solve the foregoing subject. As a result, the inventors have found that an excellent stretchable film is formed by forming a film from a blended material of a silicone-pendant type urethane, which has higher stretchability, higher strength, and higher water repellency, but has a sticky surface, together with a silicone main-chain type urethane having both of silicone and urethane in the main chain, which is low in strength but has a nonstick surface, and segregating the silicone main-chain type urethane and the silicone-pendant type urethane to the surface and the interior of the film respectively; and the formed stretchable film has higher stretchability, higher strength, and higher water repellency with non-stickiness so as not to stick the films with each other, and is particularly suitable as a stretchable substrate film to form a stretchable wiring in a wearable device or a stretchable film to coat the stretchable wiring or a device; thereby completing the present invention.

That is, the present invention is a stretchable film composition comprising:

a silicone main-chain type urethane having a structure shown by the following general formula (1)-1 and/or (1)-2, and a silicone-pendant type urethane having a structure shown by the following general formula (2)-1 and/or (2)-2:

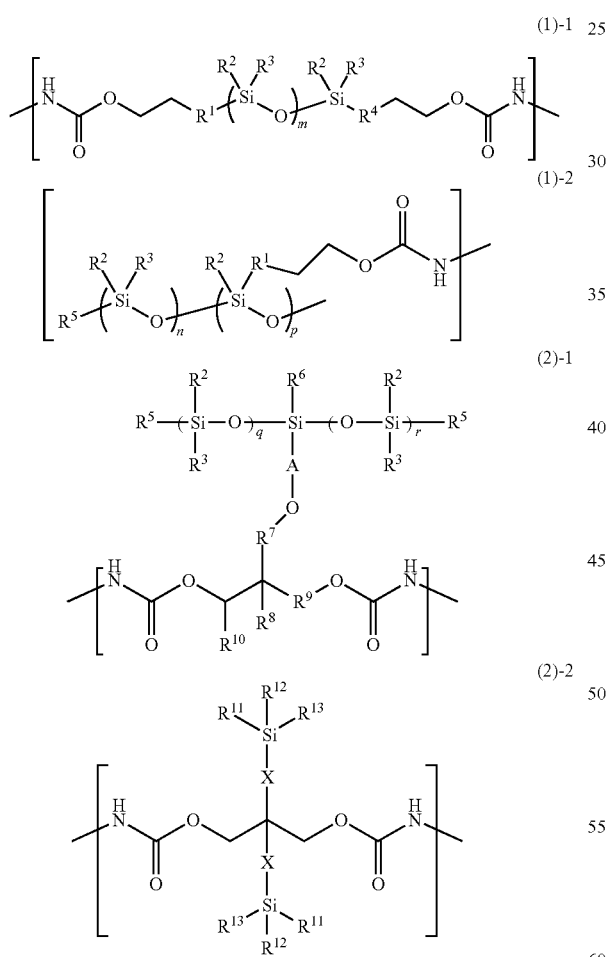

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a $-(OSiR^2R^3)_s-$ $OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

Hereinafter, the present invention will be specifically described, but the present invention is not limited thereto.

<Stretchable Film Composition>

[Silicone Main-Chain Type Urethane]

The silicone main-chain type urethane contained in the inventive stretchable film composition has a structure shown by the general formula (1)-1 and/or (1)-2:

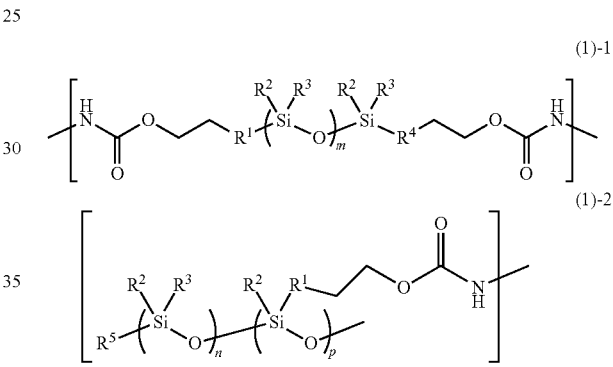

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; "m" and "n" are each an integer in the range of 1 to 100; and "p" is an integer in the range of 2 to 10.

Illustrative examples of $R^1$ and $R^4$ include a methylene group, an ethylene group, a propylene group, and a butylene group. Illustrative examples of $R^2$, $R^3$, and $R^5$ include a methyl group, an ethyl group, an isopropyl group, a 3,3,3-trifluoropropyl group, and a phenyl group.

The silicone main-chain type urethane having a structure shown by the general formula (1)-1 and/or (1)-2 preferably has a structure containing a (meth)acrylate group at a terminal thereof shown by the general formula (3)-1 and/or (3)-2:

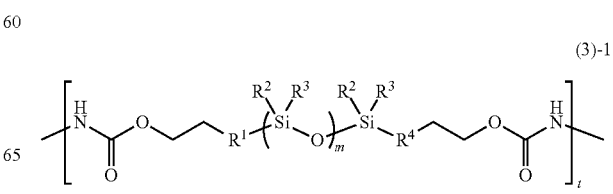

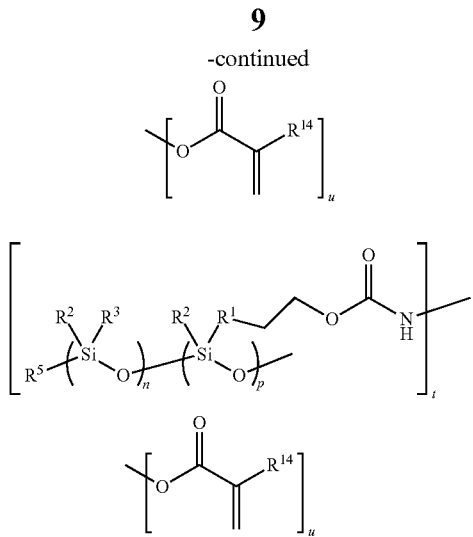

wherein $R^2$ to $R^5$, "m", "n", and "p" are the same as described above; $R^{14}$ represents a hydrogen atom or a methyl group; "t" and "u" each represent a number of unit in one molecule, and are integers in the range of 1 t 100 and 1≤u≤3.

As a silicone compound for forming the silicone main-chain type urethane having a structure of the general formula (1)-1 and/or (1)-2, the compounds shown by the following general formulae (1)-1' and (1)-2' can be exemplified:

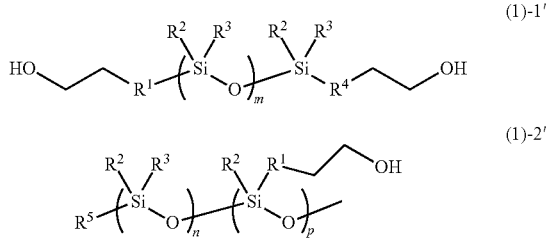

wherein $R^1$ to $R^5$, "m", "n", and "p" are the same as described above.

[Silicone-Pendant Type Urethane]

The silicone-pendant type urethane contained in the inventive stretchable film has a structure shown by the general formula (2)-1 and/or (2)-2:

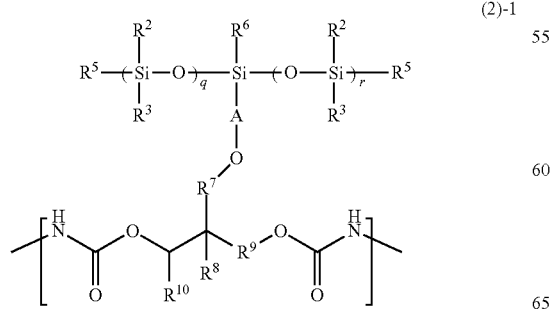

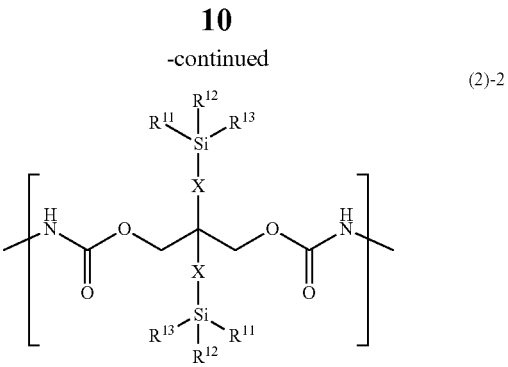

wherein $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a $—(OSiR^2R^3)_s—OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{16}$ represents a hydrogen atom or a methyl group; "A" represents a linear or branched alkylene group having 3 to 7 carbon atoms; X represents a linear or branched alkylene group having 3 to 7 carbon atoms optionally containing an ether group; and "q", "r", and "s" are each an integer in the range of 0 to 20.

The silicone-pendant type urethane having a structure shown by the general formula (2)-1 and/or (2)-2 preferably has a structure containing a (meth)acrylate group at a terminal thereof shown by the general formula (4)-1 and/or (4)-2:

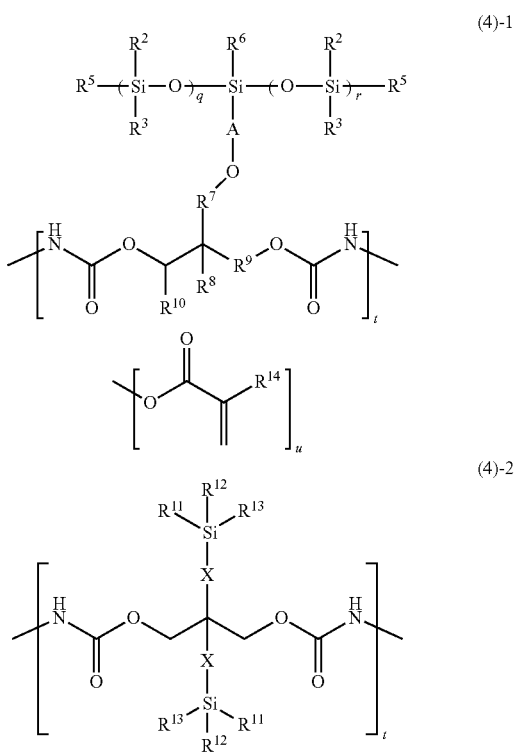

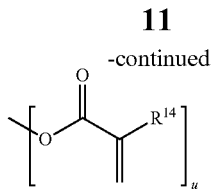

wherein $R^2$, $R^3$, $R^5$ to $R^{14}$, "A", X, "q", "t", and "u" are the same as described above.

As a diol compound for forming the silicone-pendant type urethane with the structure shown by the general formula (2)-1, the compounds shown by the following general formula (2)-1' can be exemplified:

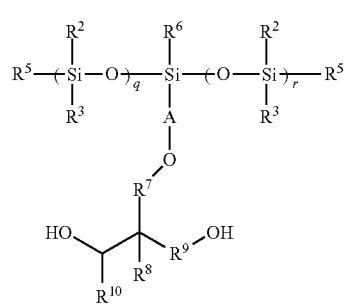

(2)-1' wherein $R^2$, $R^3$, $R^5$ to $R^{10}$, "A", "q", and "r" are the same as described above.

The diol compound having a pendant short-chain silicone shown by the general formula (2)-1' can be obtained by reaction of glycerin monoallyl ether and a short-chain siloxane compound having a SiH group under a platinum catalyst, for example. Illustrative examples of the diol compound shown by the general formula (2)-1' include the following.

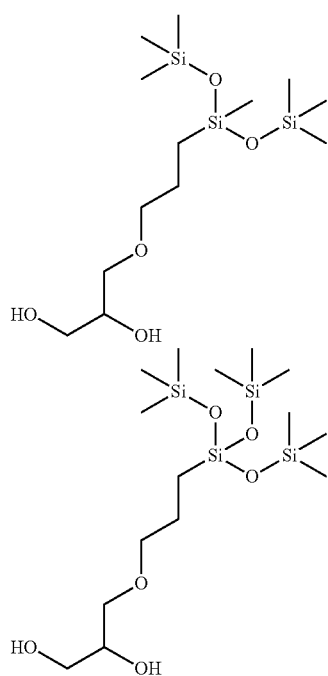

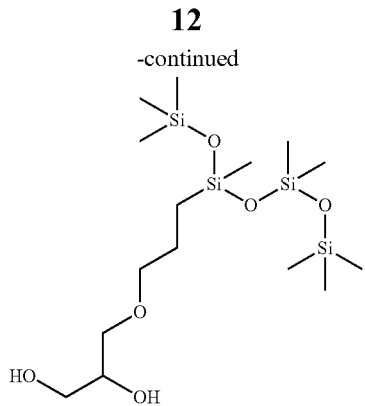

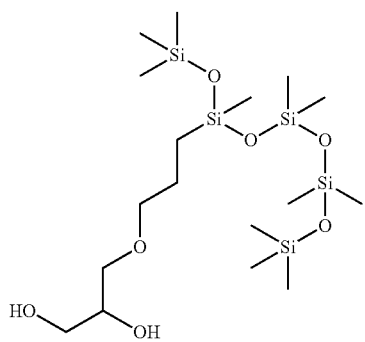

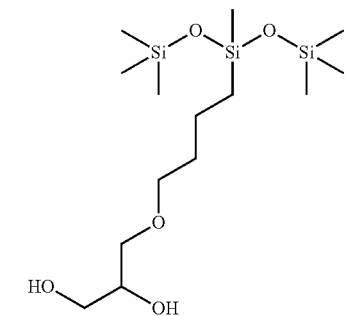

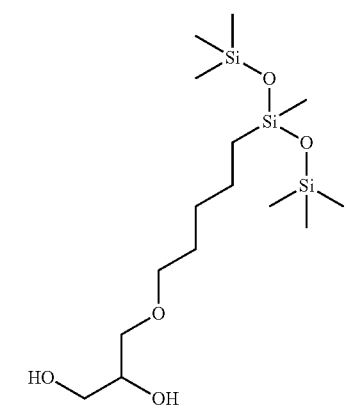

-continued
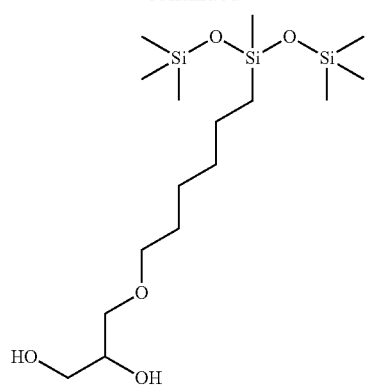
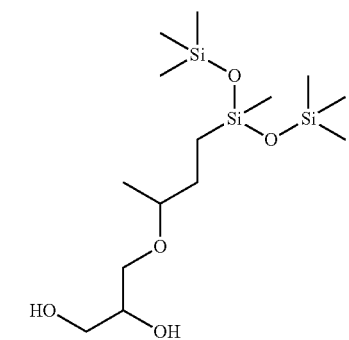
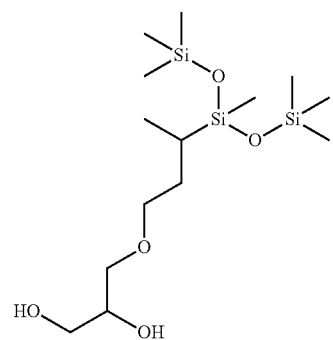
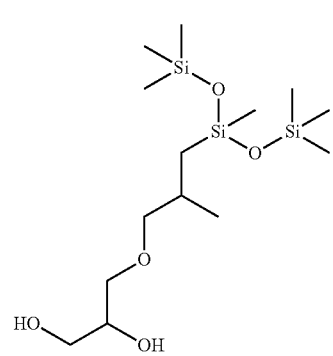
-continued
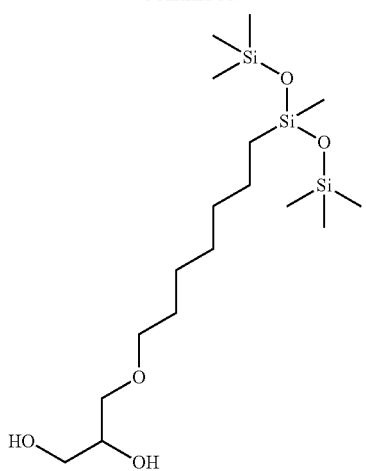
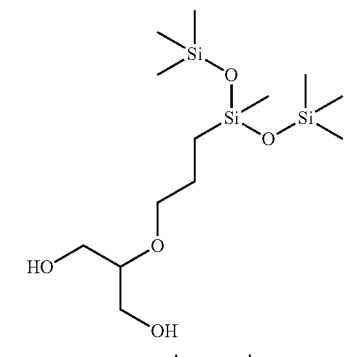
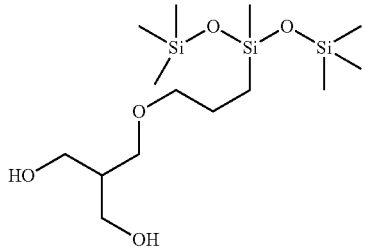
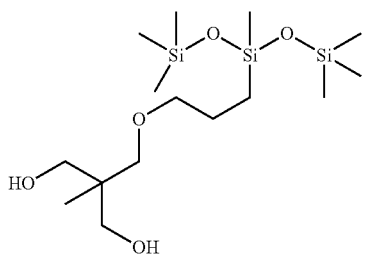
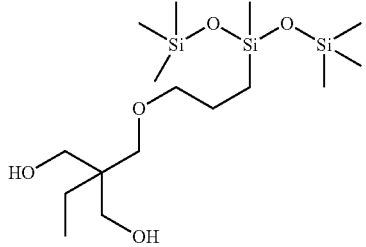

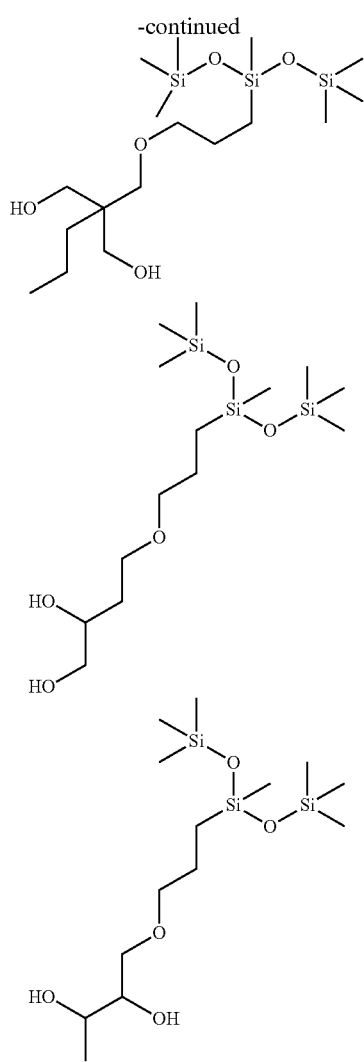

In the present invention, the compounds shown by the following general formula (2)-2' can be exemplified as a diol compound for forming the silicone-pendant type urethane shown by the general formula (2)-2.

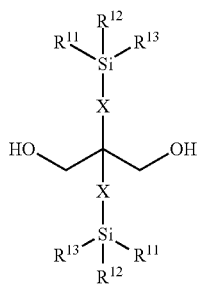

(2)-2'

In the formula, $R^{11}$ to $R^{13}$ and X are the same as described above.

The diol compound having a pendant short-chain silicone shown by the general formula (2)-2' can be obtained by reaction of a dihydroxy dialkenyl compound and a short-chain siloxane compound having a SiH group under a platinum catalyst, for example. Illustrative examples of the diol compound shown by the general formula (2)-2' include the following.

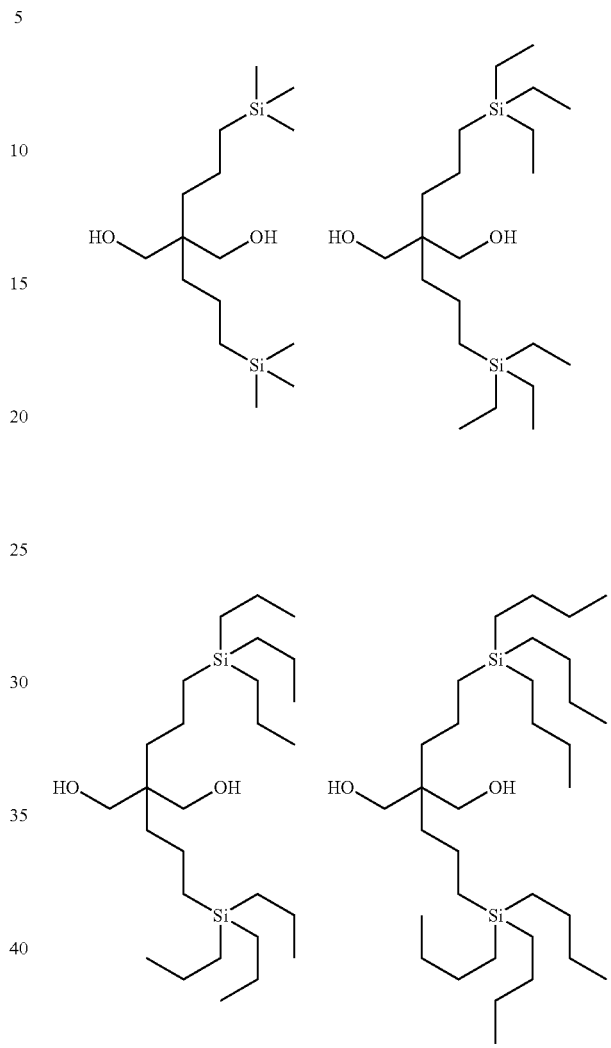

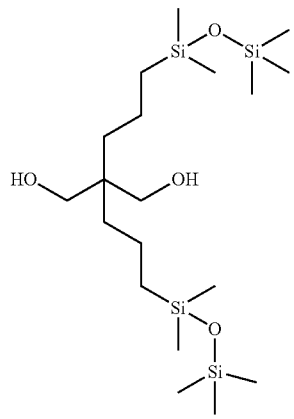

-continued
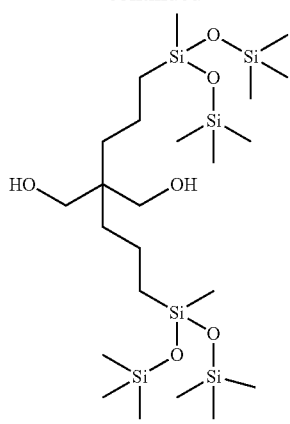
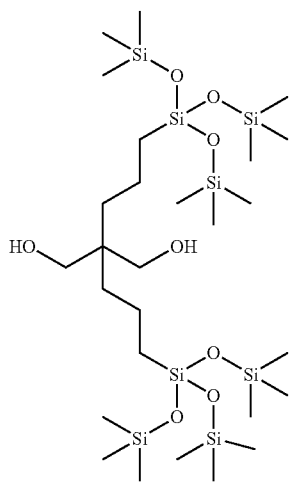
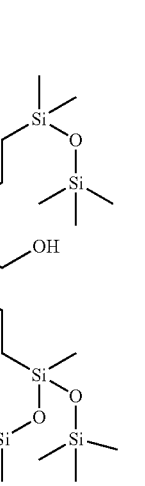 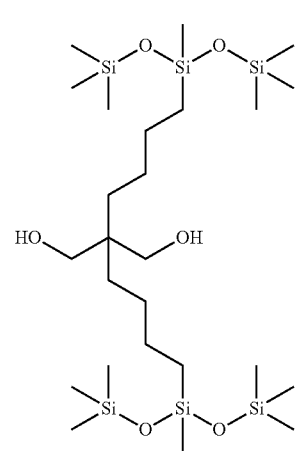
-continued
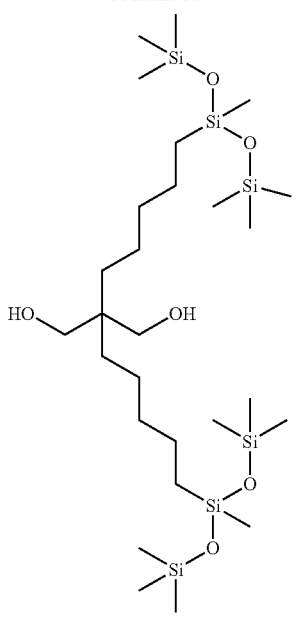
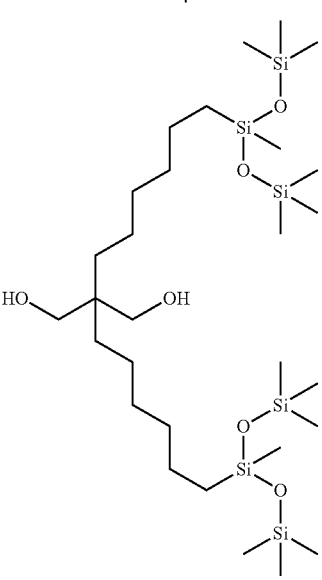
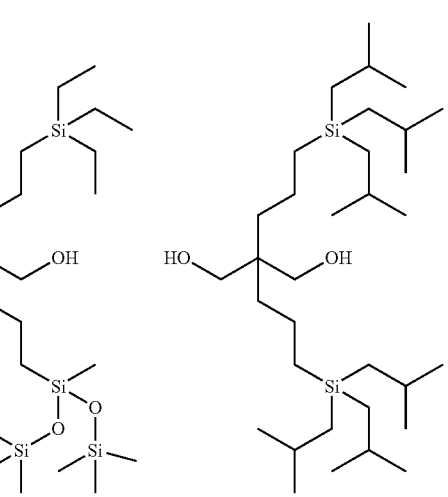

-continued
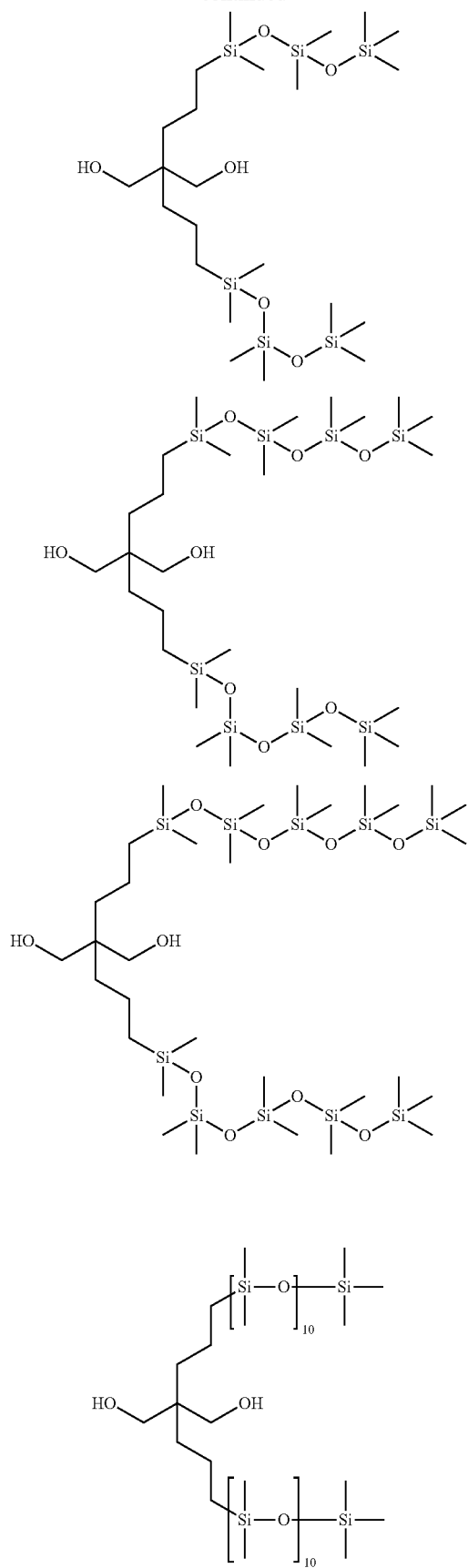
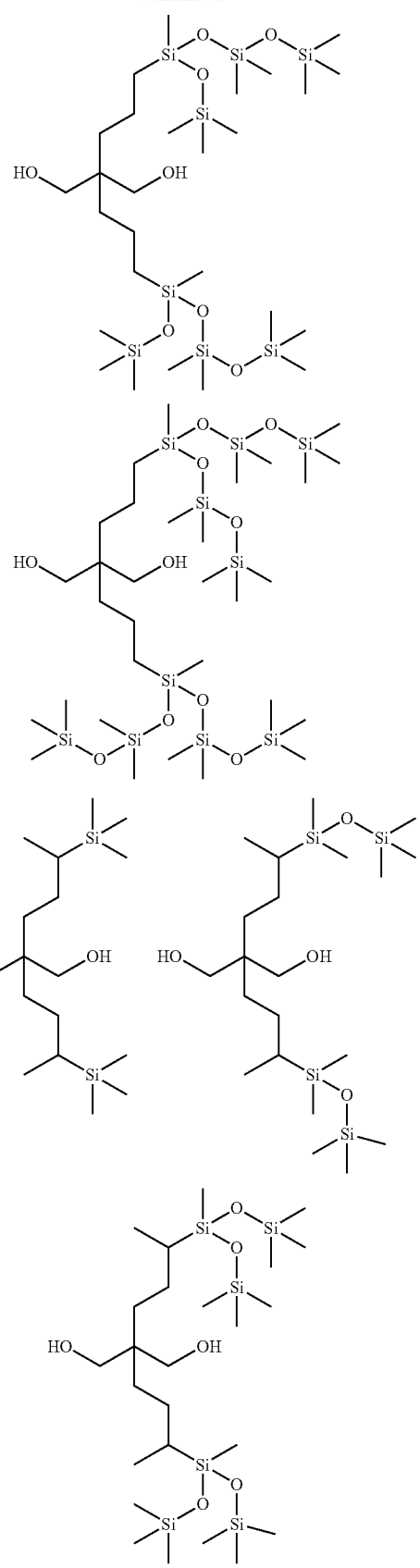

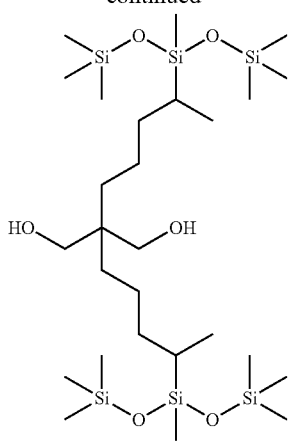
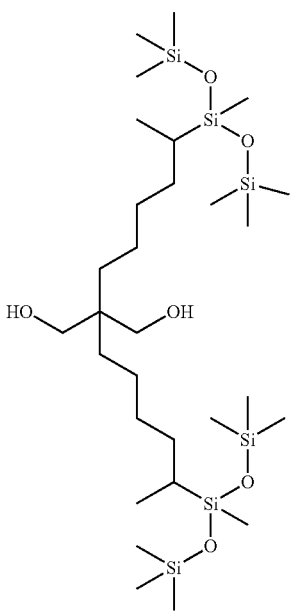
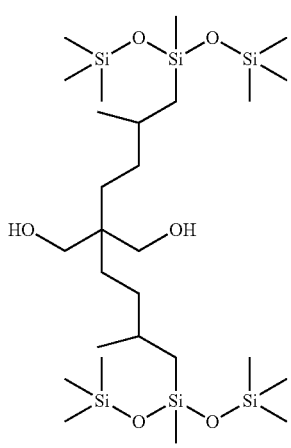
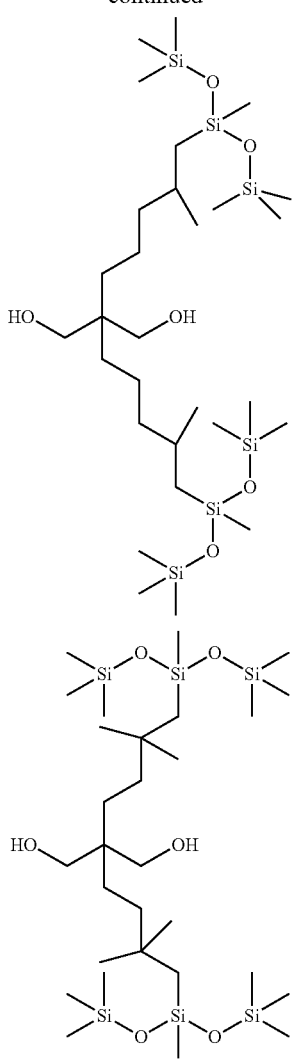
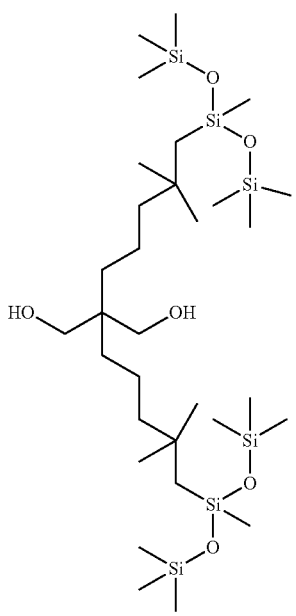

-continued
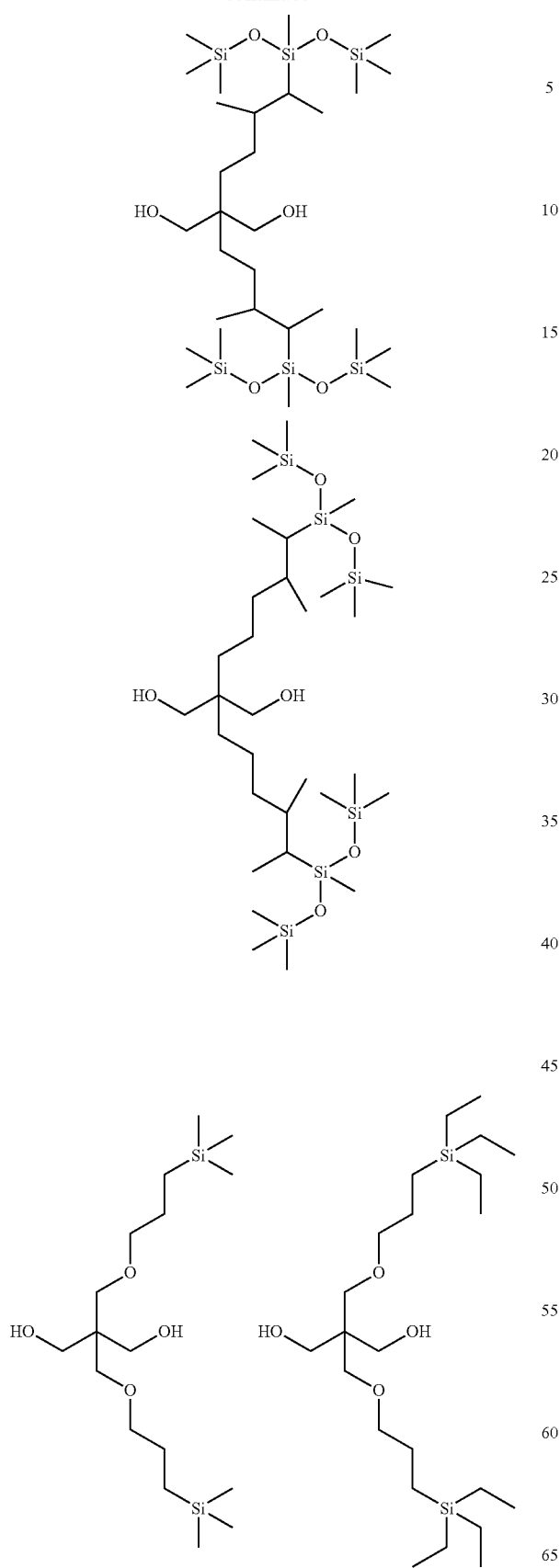
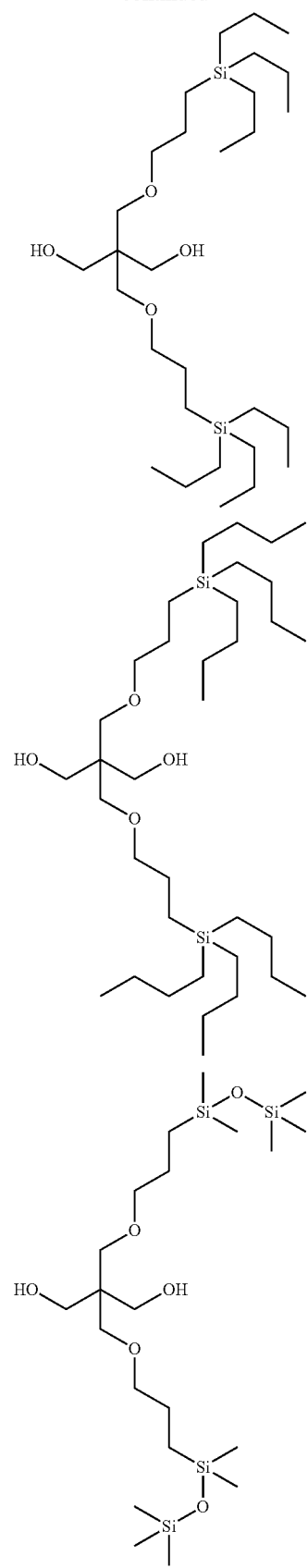

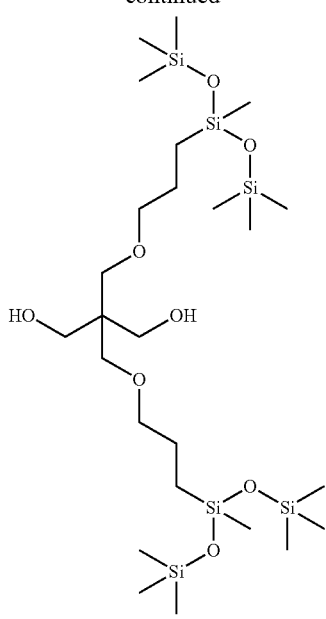
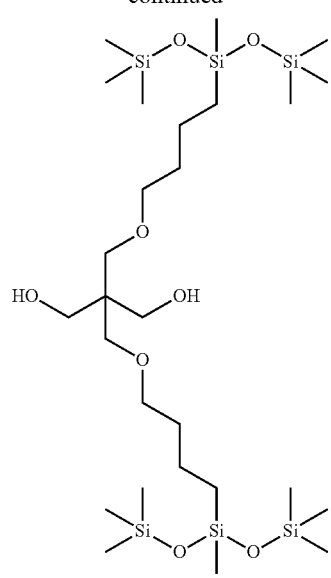
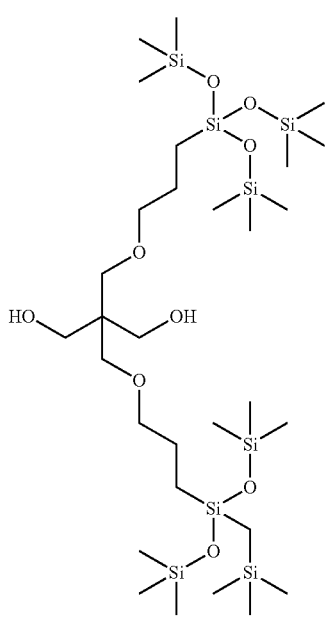
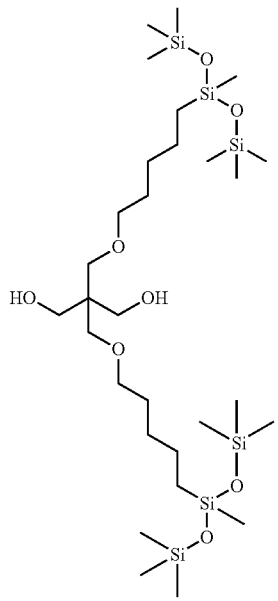

27
-continued
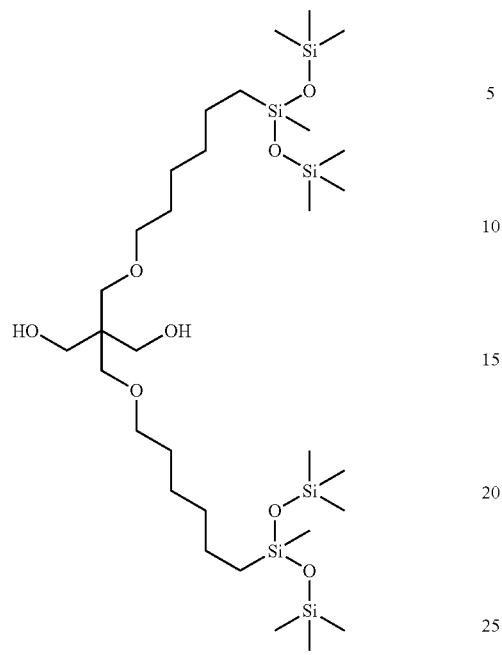
28
-continued
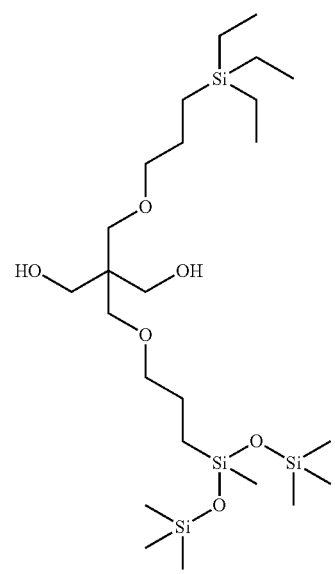
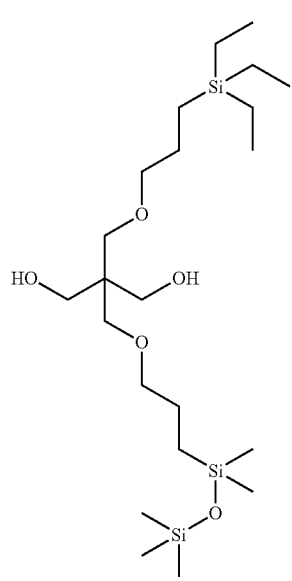
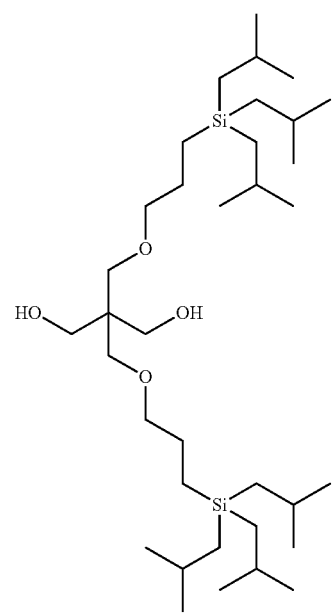

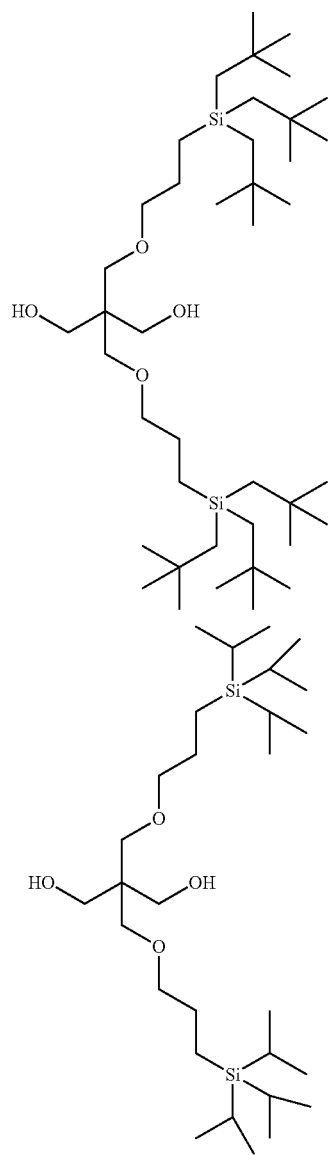
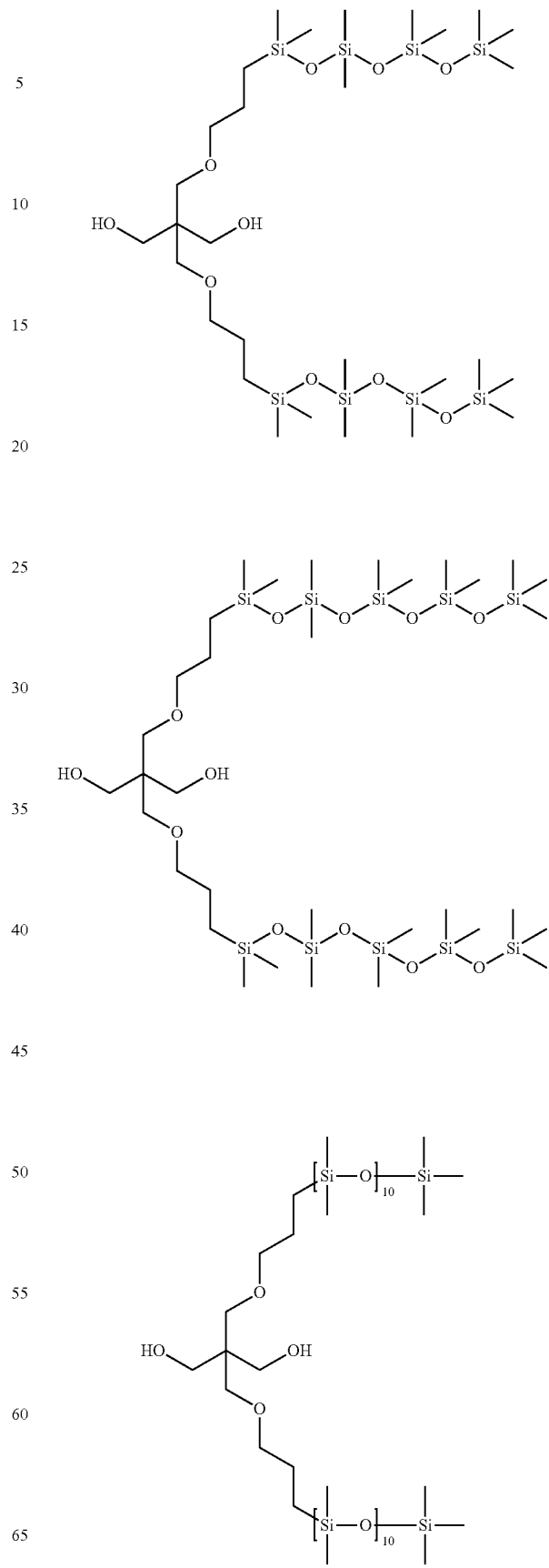

31
-continued
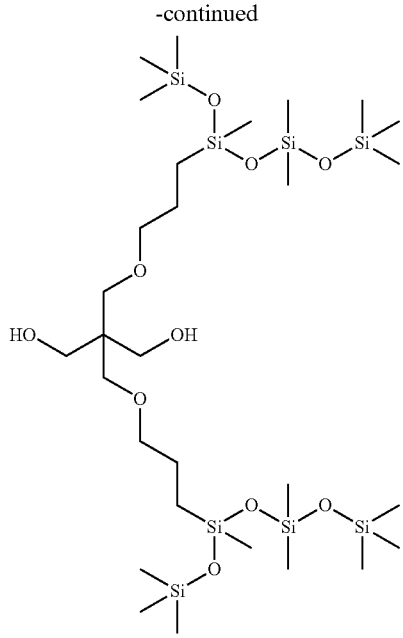
32
-continued
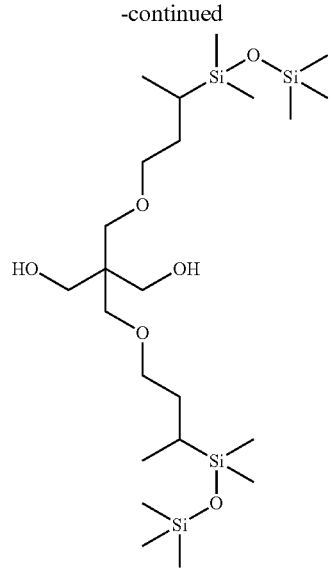
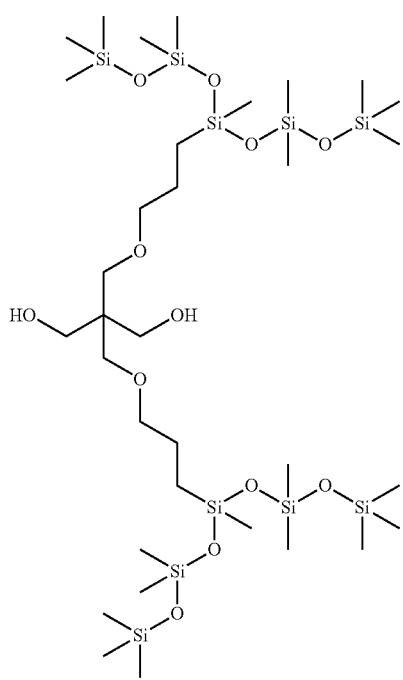
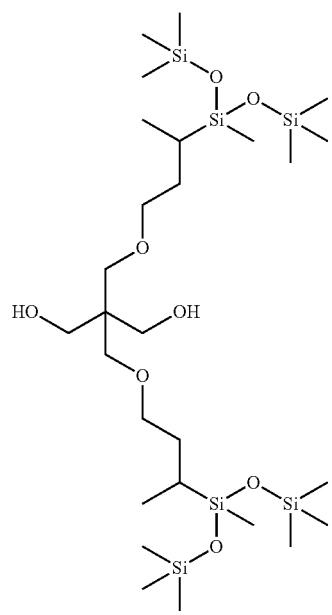

33
-continued
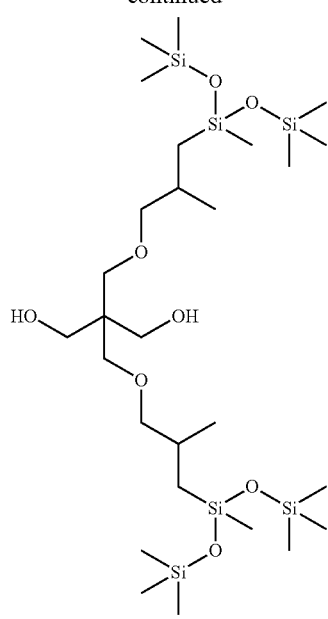
34
-continued
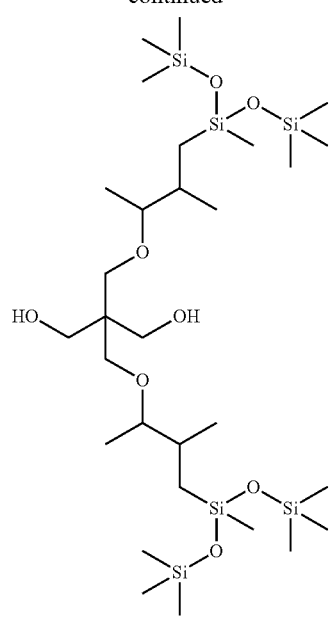
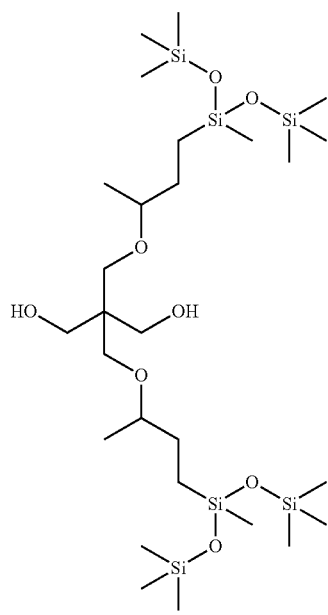
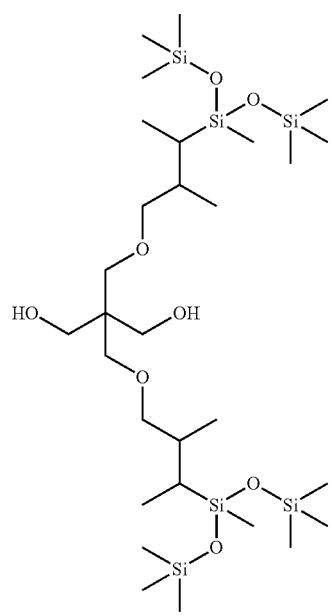

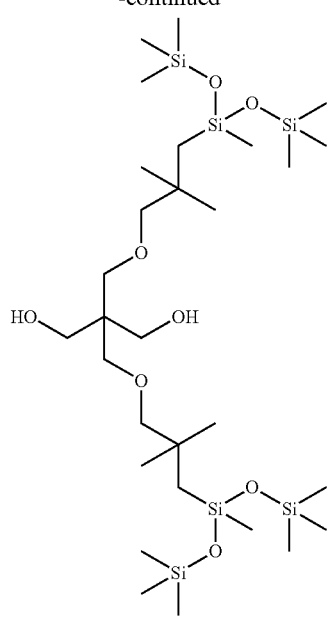

In each formula, the repeating unit represents the average value.

The resin having a structure shown by the general formula (1)-1, (1)-2, (2)-1, or (2)-2 used for forming the inventive stretchable film composition can be formed by reaction of an isocyanate compound and a raw material of a compound having a silicon-containing group shown by the general formula (1)-1', (1)-2', (2)-1', or (2)-2'.

Illustrative examples of the isocyanate compound to be used for reaction with a compound shown by the general formula (1)-1', (1)-2', (2)-1', or (2)-2' include the following.

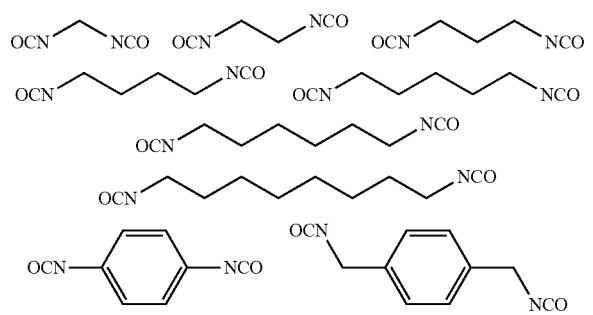

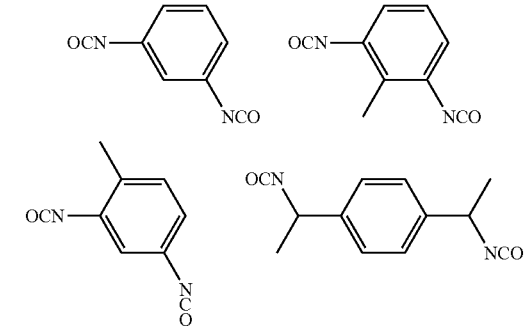

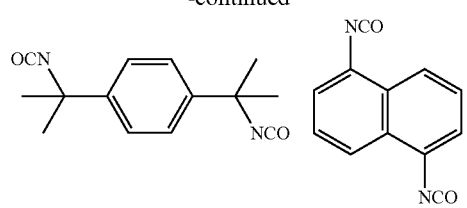

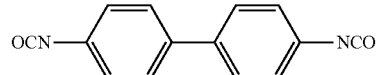

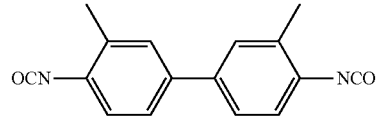

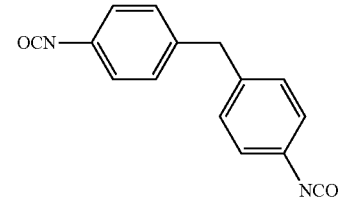

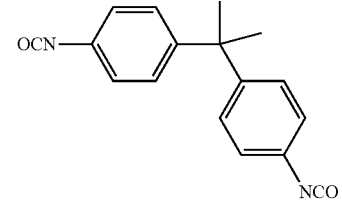

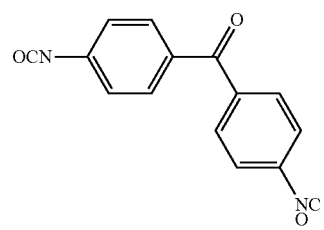

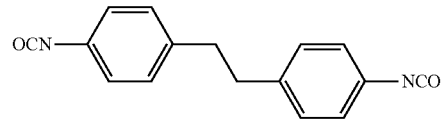

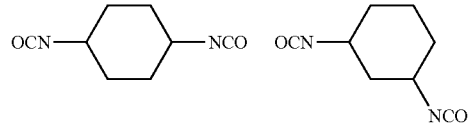

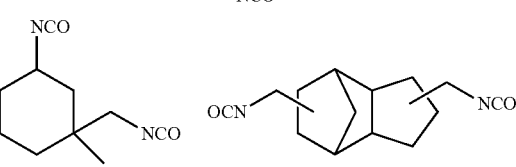

37
-continued
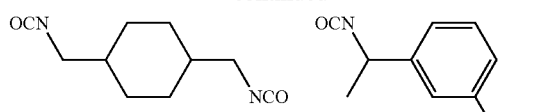
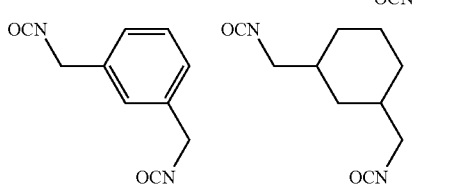
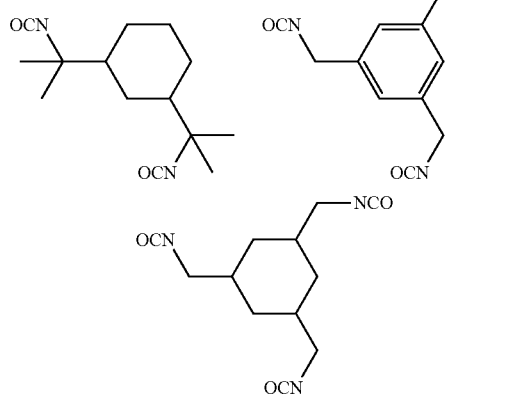
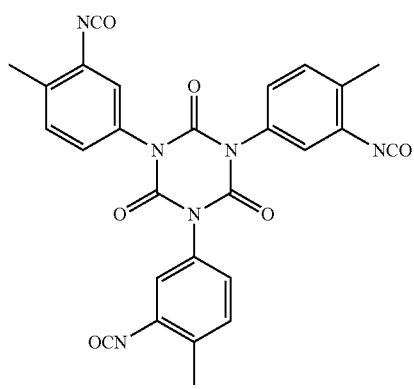
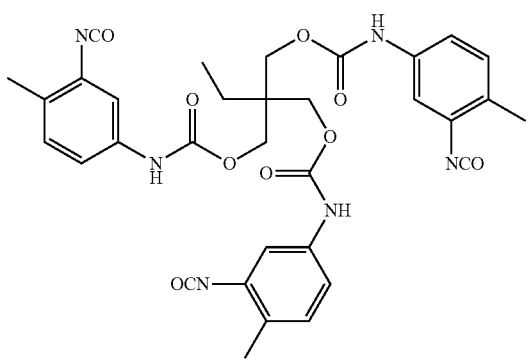
38
-continued
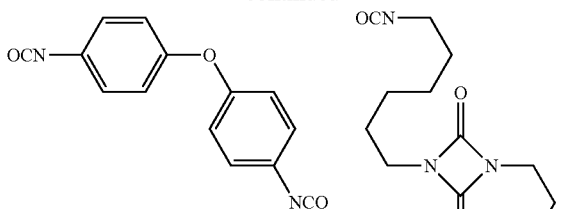
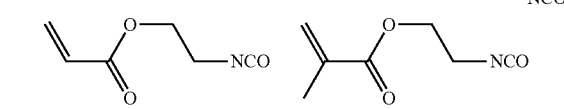
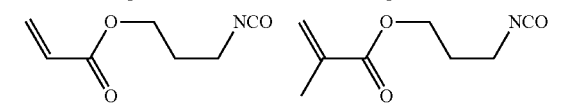
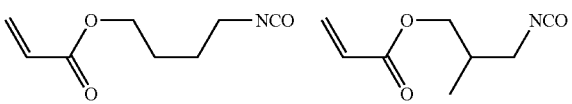
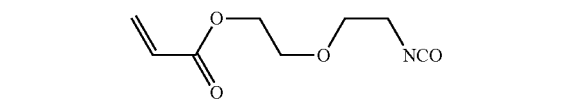
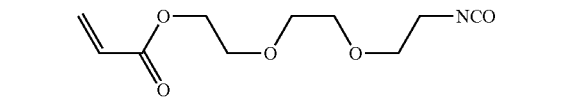
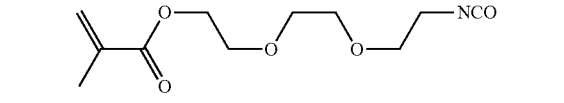
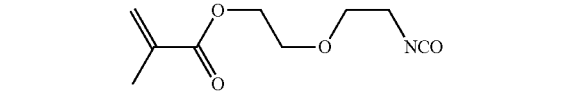
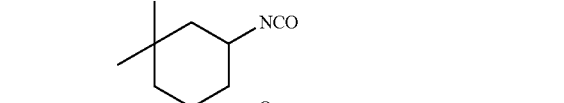
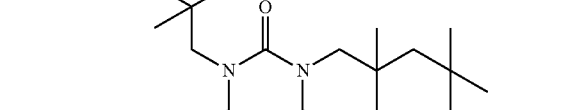
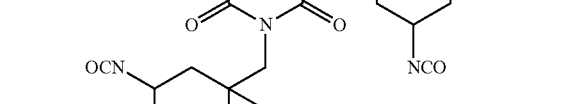
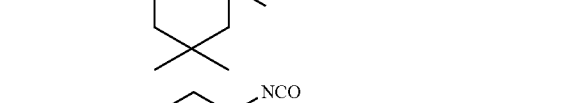
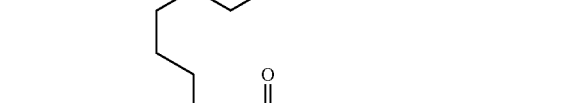
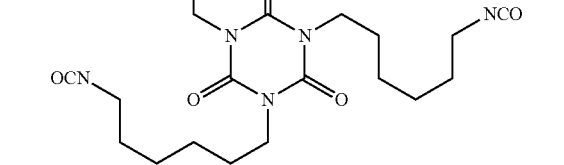

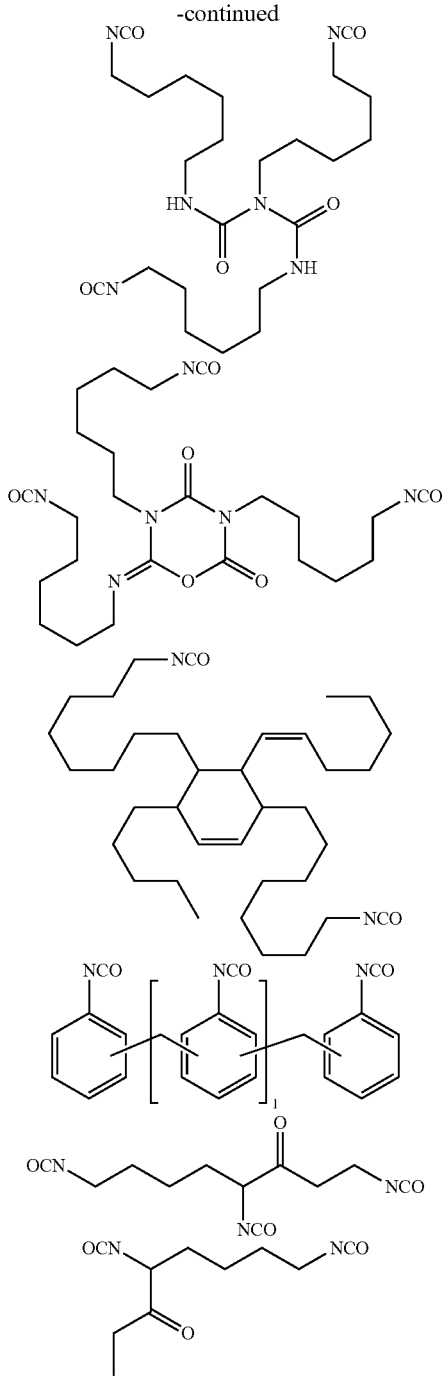

In the formula, "l" is an integer of 1 or more.

Among the isocyanate compounds described above, particularly, the isocyanate compounds having a (meth)acrylate group can give a compound having a (meth)acrylate group at the terminal shown by the general formula (3)-1, (3)-2, (4)-1, or (4)-2 through the reaction with a compound shown by the general formula (1)-1', (1)-2', (2)-1', or (2)-2'. It is also possible to obtain a compound having a (meth)acrylate group at the terminal shown by the general formula (3)-1, (3)-2, (4)-1, or (4)-2 by reaction of a compound having a (meth)acrylate group that has a hydroxy group with an isocyanate compound.

The isocyanate compounds described above have higher reactivity with a compound shown by the general formula (1)-1', (1)-2', (2)-1', or (2)-2', and the reaction is sometimes difficult to be controlled thereby. The isocyanate compound can react with moisture in the air to inactivate the isocyanate groups during the storage, and have to be carefully stored by sufficient moistureproofing and so on. Accordingly, in order to prevent these phenomena, a compound having a blocked isocyanate group may be used, in which the isocyanate group is protected with a substituent.

The blocked isocyanate group is a blocked group that is deprotected by heating to be an isocyanate group. Illustrative examples thereof include isocyanate groups substituted with alcohol, phenol, thioalcohol, imine, ketimine, amine, lactam, pyrazole, oxime, and β-diketone.

A catalyst may be added to decrease the temperature for deprotecting the blocked isocyanate groups. Illustrative examples of the catalyst include organic tin such as dibutyltin dilaurate, bismuth salt, and zinc carboxylate such as zinc 2-ethylhexanoate and zinc acetate.

In particular, JP 2012-152725A shows that it is possible to decrease the temperature for deprotection reaction by including zinc carboxylate of α,β-unsaturated carboxylic acid as a blocked isocyanate dissociation catalyst.

In addition to the compound shown by the general formula (1)-1', (1)-2', (2)-1', or (2)-2' and the isocyanate compound, a compound having a plurality of hydroxy groups may be added. The addition of such a compound having a plurality of hydroxy groups induces chain extension and intermolecular crosslinking.

The stretchability and the strength can be improved by chain extension. For example, the stretchability is improved by introducing a chain extender of polyether type having hydroxy groups at the both terminals. Both of the stretchability and the strength can be improved by introducing a chain extender of polyester type having hydroxy groups at the both terminals, and the strength can be improved substantially by introducing a chain extender of polycarbonate type.

Illustrative examples of the compound having a plurality of hydroxy groups include the following.

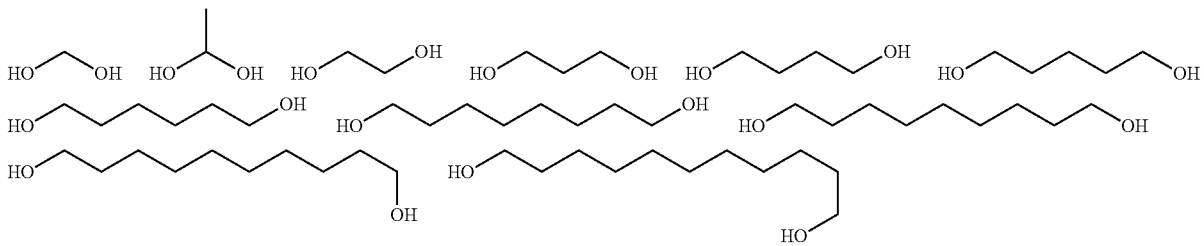

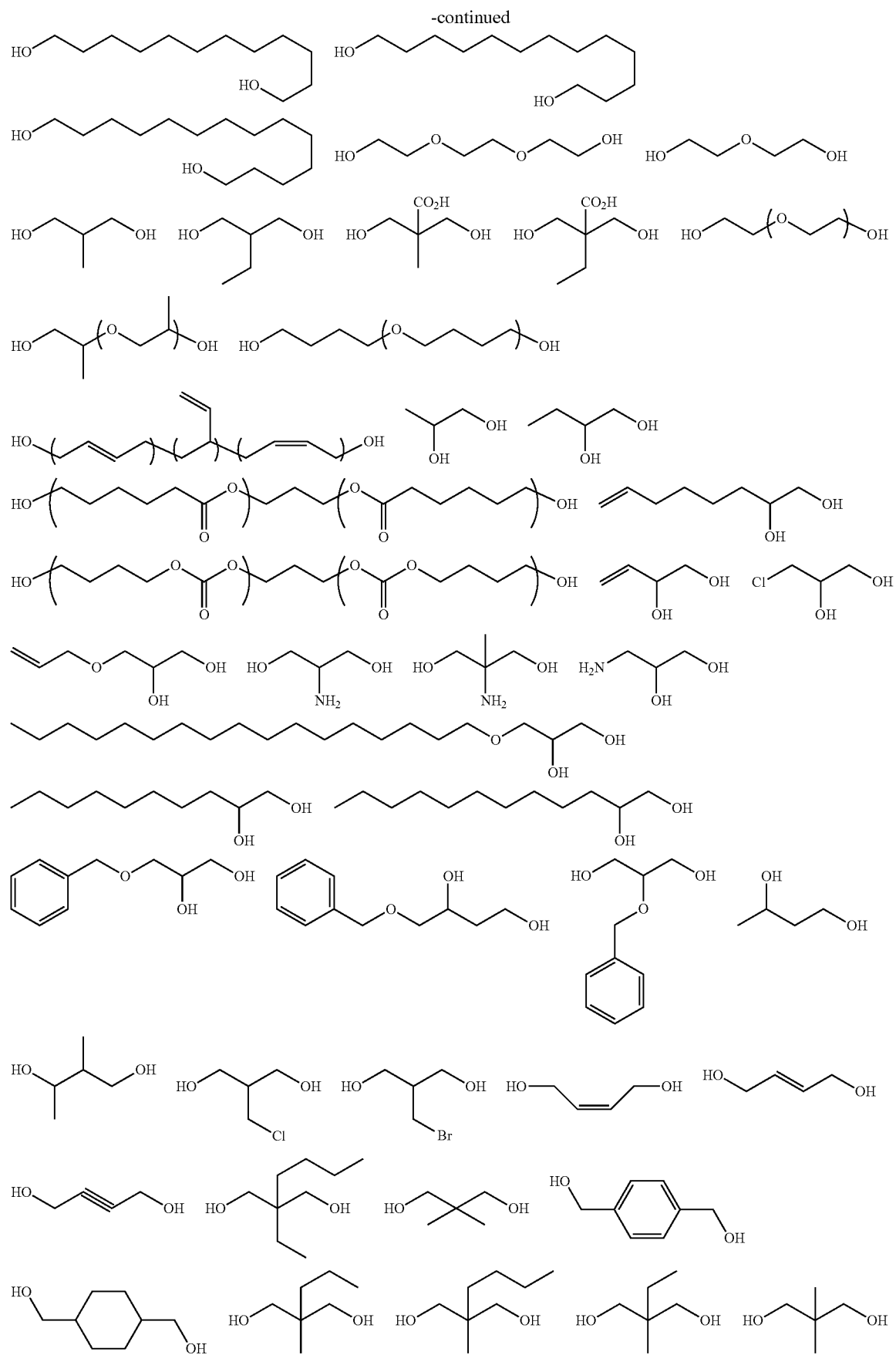
-continued

-continued
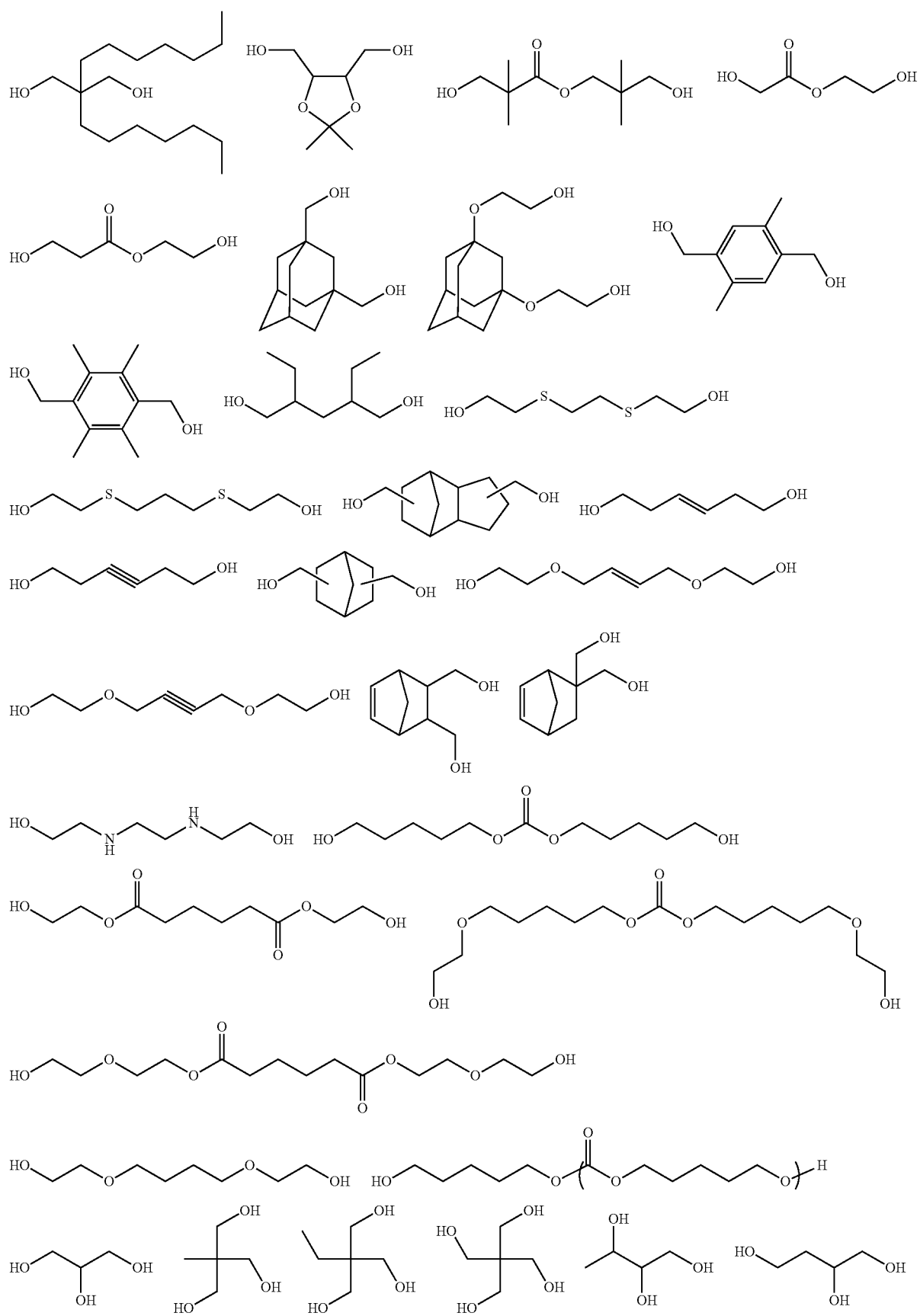

-continued

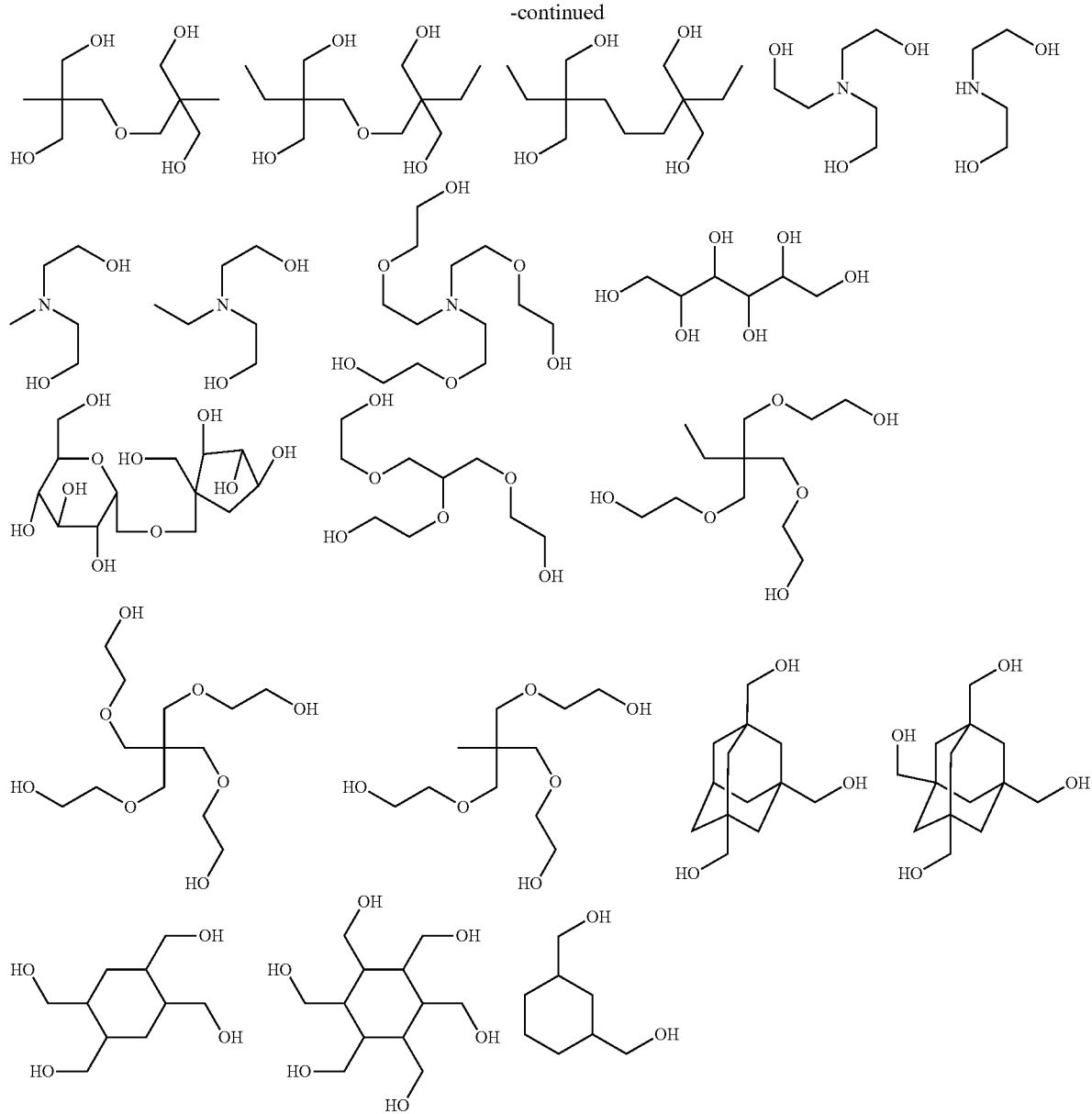

In the formulae, the numbers of the parenthesized repeating units are arbitrary numbers.

Additionally, a compound having an amino group can also be added. When an isocyanate group reacts with an amino group, a urea bond is formed. The moiety of a urethane bond and a urea bond is called as a hard segment, and improves the strength through the hydrogen bonds. The strength is successfully improved by the addition of urea bonds not only by urethane bonds.

The moiety formed of a diol compound that contains polyether, polyester, or polycarbonate for chain extension is called as a soft segment. Among them, most stretchable one is polyether, followed by polyester and polycarbonate, in which order the stretchability decreases. On the other hand, the order of tensile strength is in the opposite order to the order of stretchability. The strength and the stretchability can be controlled by selecting the kind of the soft segment or repeating unit.

The silicone urethane resin used for the inventive stretchable film preferably has a weight average molecular weight of 500 or more. They can be favorably used for the inventive stretchable film. The upper limit of the weight average molecular weight of the resin is preferably 500,000 or less.

The inventive stretchable film composition is a composition that contains a silicone main-chain type urethane shown by the general formula (1)-1 and/or (1)-2 and a silicone-pendant type urethane shown by the general formula (2)-1 and/or (2)-2. After coating this composition, the silicone main-chain type urethane segregates or orients to the surface. Regarding the mixing ratio of the silicone main-chain type urethane and the silicone-pendant type urethane, the silicone main-chain type urethane is preferably contained in a ratio of 50 mass % or less, more preferably 25 mass % or less, still more preferably 15 mass % or less based on the silicone-pendant type urethane. It is more preferable that the ratio of the silicone main-chain type urethane is lower since higher ratio thereof lowers the strength of the whole film. The silicone main-chain type urethane is capable of coating the film surface through addition of a small amount to make the surface have property of non-tackiness.

The stretchable film composition like this is favorably usable for a stretchable film having excellent stretchability and strength that are equivalent to polyurethane, together with the film surface that is excellent in water repellency and free from sticking equivalently to silicone.

<Stretchable Film>

The present invention also provides a stretchable film that contains a cured material of the stretchable film composition with the silicone main-chain type urethane being segregated or oriented to the surface.

It is to be noted that the inventive stretchable film preferably has a stretching property (i.e., elongation) of 20 to 1000% in a tensile test regulated by JIS K 6251. With such a stretching property, the stretchable film can be particularly preferably used as a coating film of a stretchable wiring.

The inventive stretchable film is preferably used for a film to be in contact with a conductive wiring having stretchability. The inventive stretchable film can be favorably used for these uses, and is also usable for a stretchable substrate on which conductive wiring is formed and a cover film to coat conductive wiring.

The inventive stretchable film described above has excellent stretchability and strength that are equivalent to polyurethane, together with a film surface that has excellent water repellency and is free from stickiness equivalently to silicone.

<Method for Forming Stretchable Film>

The present invention also provides a method for forming the stretchable film that include forming a film from the stretchable film composition described above, and then, curing the film by heating and/or light exposure.

In this case, a solution of the composition can be prepared by synthesizing a urethane polymer through reaction of isocyanate groups and hydroxy groups, forming a (meth) acrylate group(s) at the terminal(s) as shown in general formula (3)-1, (3)-2, (4)-1, or (4)-2, and then mixing a compound that has a structure shown by the general formula (3)-1 and/or (3)-2 and a compound that has a structure shown by the general formula (4)-1 and/or (4)-2. After forming a film from the solution of the composition, the silicone main-chain type urethane of the general formula (3)-1 and/or (3)-2 segregates or orients to the film surface. In order to accelerate the segregation or orientation, it is also possible to perform heating or to add an organic solvent to the composition. This is then cured by heating and/or light exposure to successfully form a stretchable film in which the silicone main-chain type urethane is segregated and/or oriented to the surface.

The curing of the stretchable film composition can be performed by crosslinking the (meth)acrylate through radial reaction. As a method for radical crosslinking, addition of a radical generator is desirable. The radical generator includes a thermal-radical generator, which generates a radical by thermal decomposition, and a photo-radical generator, which generates a radical by light exposure.

Illustrative examples of the heat radical generator include an azo radical generator and a peroxide radical generator. Illustrative examples of the azo radical generator include 2,2'-azobisisobutyronitrile (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), and 4,4'-azobis(4-cyanovaleric acid). Illustrative examples of the peroxide radical generator include benzoyl peroxide, decanoyl peroxide, lauroyl peroxide, succinyl peroxide, t-butylperoxy-2-ethylhexanoate, t-butylperoxypivaloate, and 1,1,3,3-tetramethylbutylperoxy-2-ethylhexanoate.

Illustrative examples of the photo radical generator include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1-2'-biimidazole, methyl 2-benzoylbenzoate, 2-(1,3-benzodioxole-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl) phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

It is to be noted that the loading amount of the thermal-radical generator or the photo-radical generator is preferably in the range of 0.1 to 50 parts by mass based on 100 parts by mass of the resin.

It is also possible to add a crosslinking agent that has a plurality of (meth)acrylate or thiol. This makes it possible to improve the efficiency of radical crosslinking.

It is also possible to add a monomer that has an alkyl group or an aryl group, or a monomer that has an alkyl group or an aryl group substituted with a silicon-containing group or a fluorine. This makes it possible to decrease the viscosity of the solution to form a stretchable film with thinner thickness. When these monomers each have a polymerizable double bond, they can be fixed into the film in curing the film.

Illustrative examples of the monomer that has an alkyl group or an aryl group include isobornyl acrylate, lauryl acrylate, tetradecyl acrylate, stearyl acrylate, isostearyl acrylate, behenyl acrylate, adamantane acrylate, phenoxyethylene glycol acrylate, phenoxydiethylene glycol acrylate, and 2 to 6 functional acrylates. Illustrative examples of the bifunctional acrylate include 1,6-hexanediol diacrylate, 1,9-nonanediol diacrylate, isononanediol diacrylate, 1,10-decanediol diacrylate, neopentyl glycol diacrylate, 2-hydroxy-3-methacrylpropyl acrylate, diethylene glycol diacrylate, triethylene glycol diacrylate, polyethylene glycol diacrylate, dipolyethylene glycol diacrylate, tripropylene glycol diacrylate, polypropylene glycol diacrylate, polytetramethylene glycol diacrylate, polyethylene polypropylene glycol diacrylate, dioxane glycol diacrylate, tricyclodecanedimethanol diacrylate, 9,9-bis[4-(2-hydroxyethoxy)phenyl]fluorene diacrylate, ethoxylated bisphenol A diacrylate, propoxylated bisphenol A diacrylate, and ethoxylated propoxylated bisphenol A diacrylate. Illustrative examples of trifunctional acrylate include trimethylolpropane triacrylate, ethoxylated trimethylolpropane triacrylate, propoxylated trimethylolpropane triacrylate, glycerin triacrylate, ethoxylated glycerin triacrylate, propoxylated glycerin triacrylate, tris(2-acryloxyethyl)isocyanurate, caprolactone modified tris(2-acryloxyethyl)isocyanurate, and pentaerythritol triacrylate. Illustrative examples of tetrafunctional acrylate include pentaerythritol tetraacrylate, ethoxylated pentaerythritol tetraacrylate, propoxylated pentaerythritol tetraacrylate, ditrimethylolpropane tetraacrylate, ethoxylated ditrimethylolpropane tetraacrylate, and propoxylated ditrimethylolpropane tetraacrylate. Illustrative examples of penta- or hexa-functional acrylate include dipentaerythritol polyacrylate, ethoxylated dipentaerythritol polyacrylate, and propoxylated dipentaerythritol polyacrylate. It is also possible to use a monomer in which the above acrylate is replaced by methacrylate.

The methods of forming the inventive stretchable film include a method of applying the inventive stretchable film composition onto a planer substrate or a roll. Illustrative examples of the method for applying the stretchable film composition include spin coating, bar coating, roll coating, flow coating, dip coating, spray coating, and doctor coating. The coating is preferably performed so as to have a coating film thickness of 1 to 2 mm.

For encapsulating a part with unevenness, it is preferable to use a method such as bar coating using a soft squeegee, roll coating, and spray coating; a method of screen printing to coat a part that requires to be coated, etc. In order to perform various coating or printing, the viscosity of the mixed solution have to be controlled. When lower viscosity is required, organic solvent may be added; when higher viscosity is required, filler such as silica is mixed.

The organic solvent is preferably an organic solvent with the boiling point being in the range of 115 to 200° C. at atmospheric pressure. It is preferable to use one or more organic solvents selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

In case of curing of the compound that has a (meth) acrylate group at the terminal by heating, the heat curing can be performed with a hot plate, in an oven, or by irradiation of far infrared ray, for example. The heating condition is preferably at 30 to 150° C. for 10 seconds to 60 minutes, more preferably 50 to 120° C. for 30 seconds to 20 minutes. The baking may be performed in any environment such as in the atmosphere, in an inert gas, or in vacuum.

In case of curing of the compound that has a (meth) acrylate group at the terminal by light exposure, the light exposure is preferably performed with a light having a wavelength of 200 to 500 nm. As the light source, a halogen lamp, a xenon lamp, excimer laser, a metal halide lamp, and LED can be used, for example. Irradiation with electron beam is also preferable. The irradiation quantity is preferably in the range of 1 mJ/cm$^2$ to 100 J/cm$^2$.

The inventive stretchable film can be formed on fiber or a membrane film, not only used solely as a self-standing film, and can be used as a film to coat stretchable wiring or a device.

Figure 2:
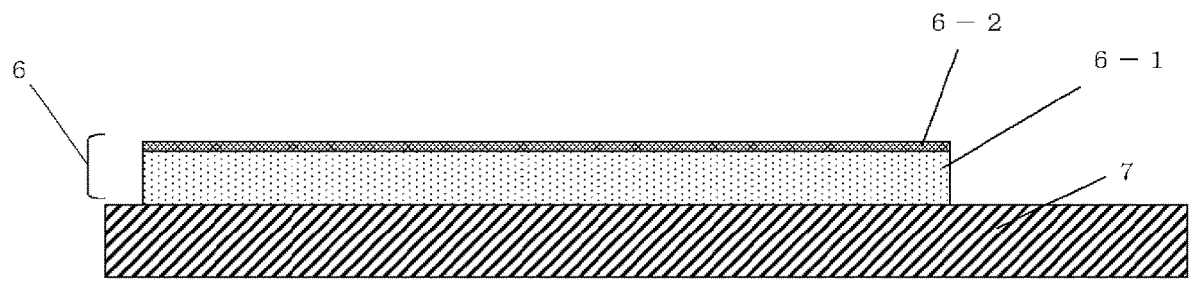
FIG. 2 is a cross-sectional view showing the state of forming a stretchable film of the present invention on a substrate.
Figure 3:
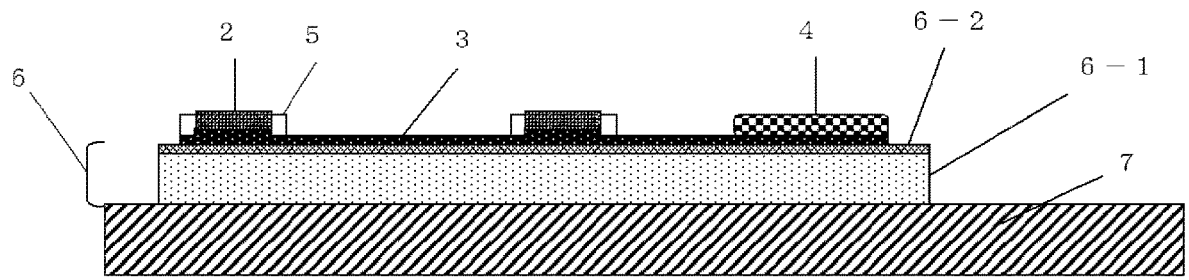
FIG. 3 is a cross-sectional view showing the state of forming an electrocardiograph on a stretchable film of the present invention.
Figure 4:
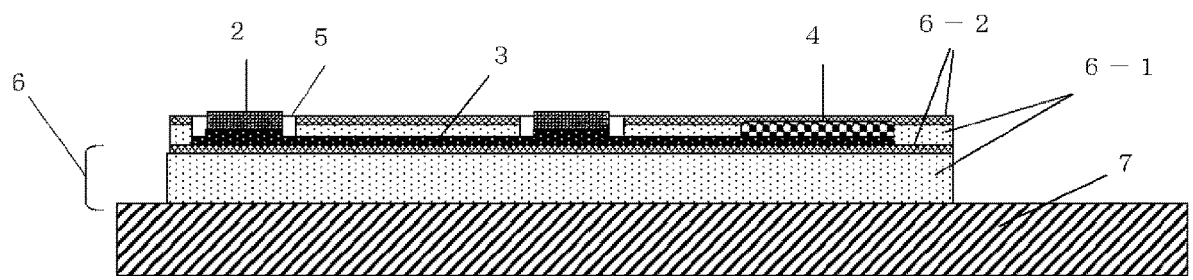
FIG. 4 is a cross-sectional view showing the state of covering the wiring and the center device in FIG. 3 with a stretchable film.

Examples of using the inventive stretchable film are shown in FIGS. 1 to 7. FIG. 1 is a schematic illustration of an electrocardiograph 1 formed on a stretchable film 6 of the present invention viewed from a bio-electrode side. FIG. 2 is a cross-sectional view showing the state of forming the stretchable film 6 of the present invention on a substrate 7; FIG. 3 is a cross-sectional view showing the state of forming the electrocardiograph 1 on the stretchable film 6 of the present invention; FIG. 4 is a cross-sectional view showing the state of covering the stretchable wiring 3 and the center device 4 of the electrocardiograph 1 in FIG. 3 with the stretchable film 6, in which the electrocardiograph 1 in FIG. 1 is the similar one described in Patent Document 1. As shown in FIG. 1, in the electrocardiograph 1, three bio-electrodes 2 are linked to the wiring 3, which conducts electric signals, and are connected to the center device 4.

As the material of the wiring 3, electrically conductive material are generally used, including metal such as gold, silver, platinum, titanium, and stainless as well as carbon. The wiring 3 can be a meandering-shape as described in Patent Literature 1 to provide stretchability, and can be formed by pasting powder of the electrically conductive material or wire of the electrically conductive material on a stretchable film, printing electrically conductive ink that contains the electrically conductive material on a stretchable film, or using an electrically conductive fabric in which electrically conductive material and fibers are combined.

Since the electrocardiograph 1 have to be attached to skin, an adhesive part 5 is disposed around the bio-electrode 2 in FIGS. 3 and 4 in order not to separate the bio-electrode 2 from skin. Incidentally, when the bio-electrode 2 has adhesiveness, the surrounding adhesive part 5 is not necessarily essential.

This electrocardiograph 1 is produced on the stretchable film 6, which is the stretchable film of the present invention, as shown in FIG. 1. Since the silicone-pendant type urethane layer 6-1 is covered with the silicone main-chain type urethane layer 6-2, which has little stickiness on the surface, the stretchable film 6 shows favorable printing plate-release when printing is performed thereon by screen printing and so on. Ill printing plate-release is unfavorable since it causes ink-release when the printing plate is released, thereby failing to transfer the ink onto the stretchable film.

Moreover, the stretchable wiring 3 can be covered with the stretchable film 6 of the present invention as shown in FIG. 4.

Figure 5:
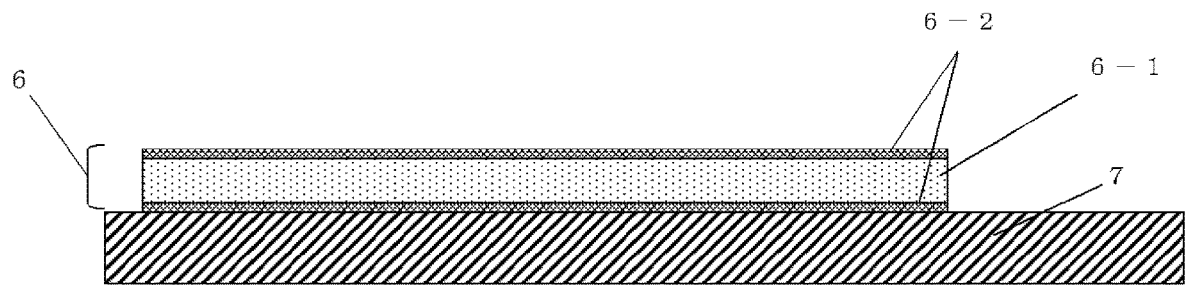
FIG. 5 is a cross-sectional view showing the state in which the film formed in FIG. 2 is inverted on the substrate, and a stretchable film is formed thereon again.
Figure 6:
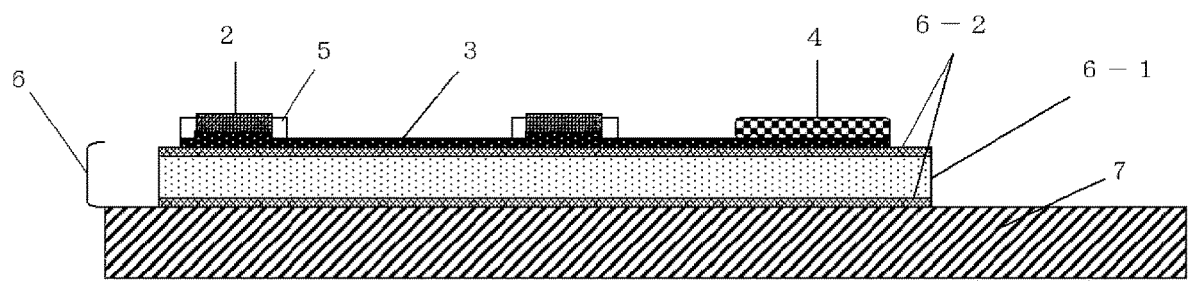
FIG. 6 is a cross-sectional view showing the state of forming an electrocardiograph on the stretchable film in FIG. 5.
Figure 7:
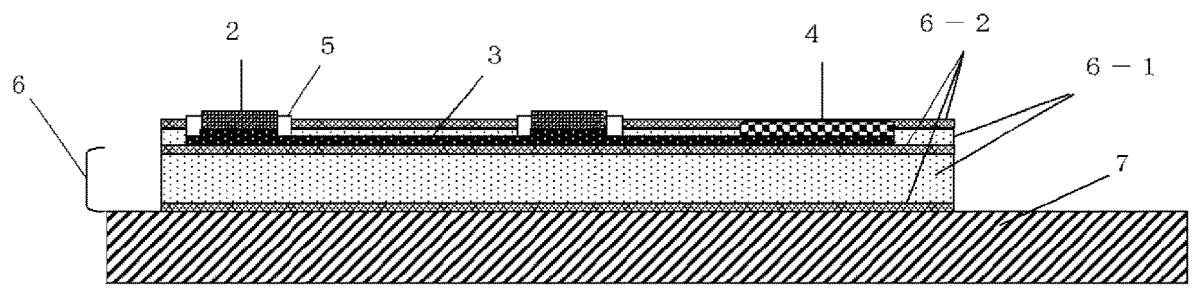
FIG. 7 is a cross-sectional view showing the state of covering the wiring and the center device in FIG. 6 with a stretchable film.

Furthermore, it is also possible to invert the stretchable film formed in FIG. 2 and form the same stretchable film (or layer) at the other side as shown in FIG. 5. The cross-sectional view of an electrocardiograph using the stretchable film in this case is shown in FIG. 6 or FIG. 7.

The inventive method for forming a stretchable film described above makes it possible to easily form a stretchable film that has excellent stretchability and strength equivalent to or superior to those of polyurethane, with the film surface having higher water repellency and low tackiness.

EXAMPLES

Hereinafter, the present invention will be specifically described with reference to Examples and Comparative Examples, but the present invention is not limited thereto. Incidentally, the weight average molecular weight (Mw) represents a weight average molecular weight in terms of polystyrene determined by gel permeation chromatography (GPC).

Silicone-pendant urethane-(meth)acrylates-1 to 8 and Silicone urethane-(meth)acrylates-1 to 5 blended into each composition for forming a stretchable film as a compound having (meth)acrylate groups at the terminals are shown as follows.

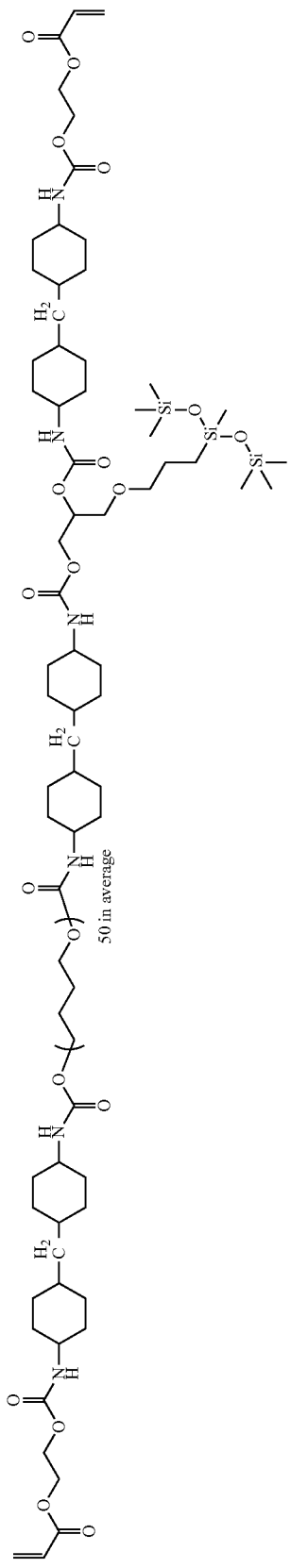
Silicone-pendant urethane-(meth)acrylate-1
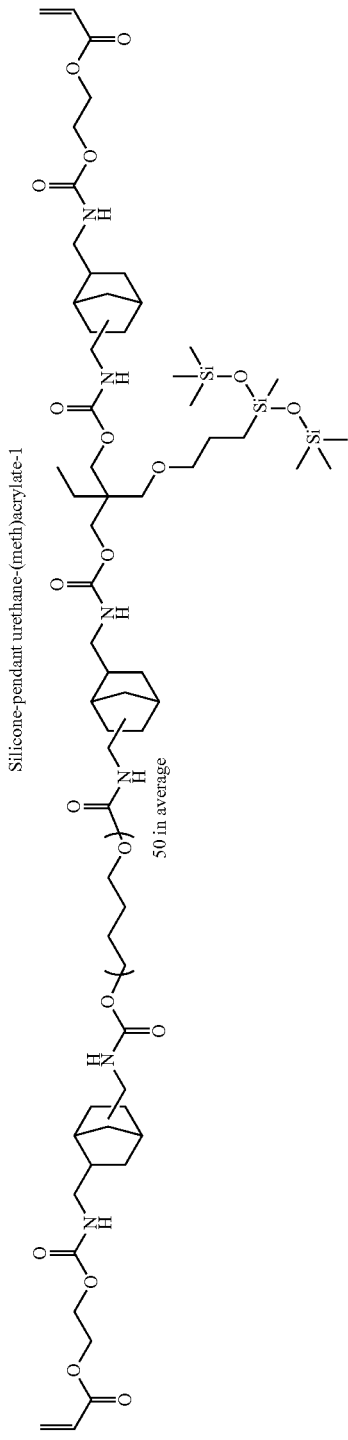
Silicone-pendant urethane-(meth)acrylate-2

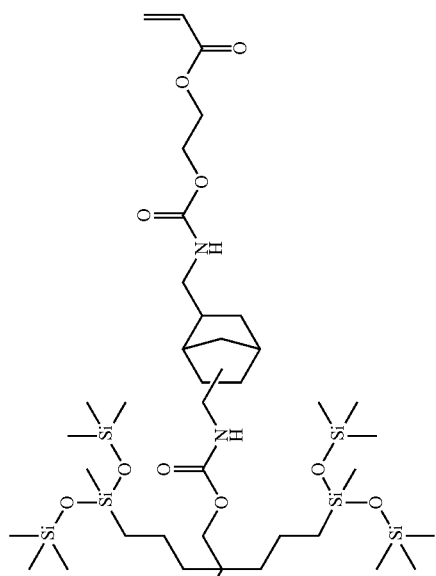
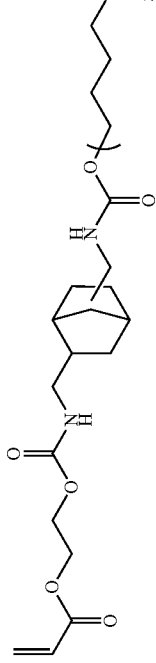
Silicone-pendant urethane-(meth)acrylate-3
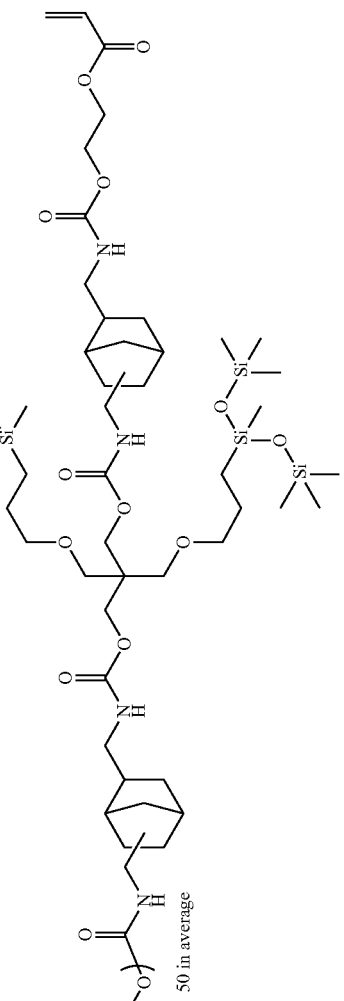
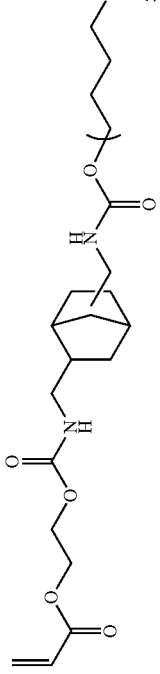
Silicone-pendant urethane-(meth)acrylate-4

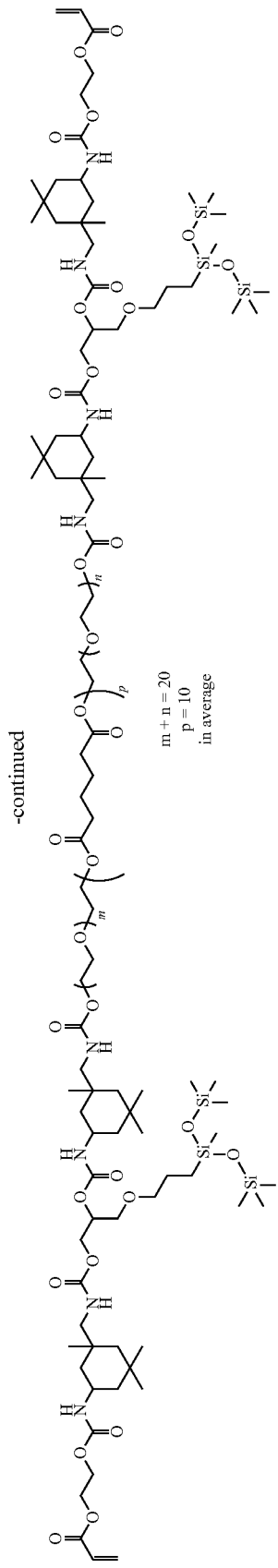
Silicone-pendant urethane-(meth)acrylate-5
m + n = 20
p = 10
in average
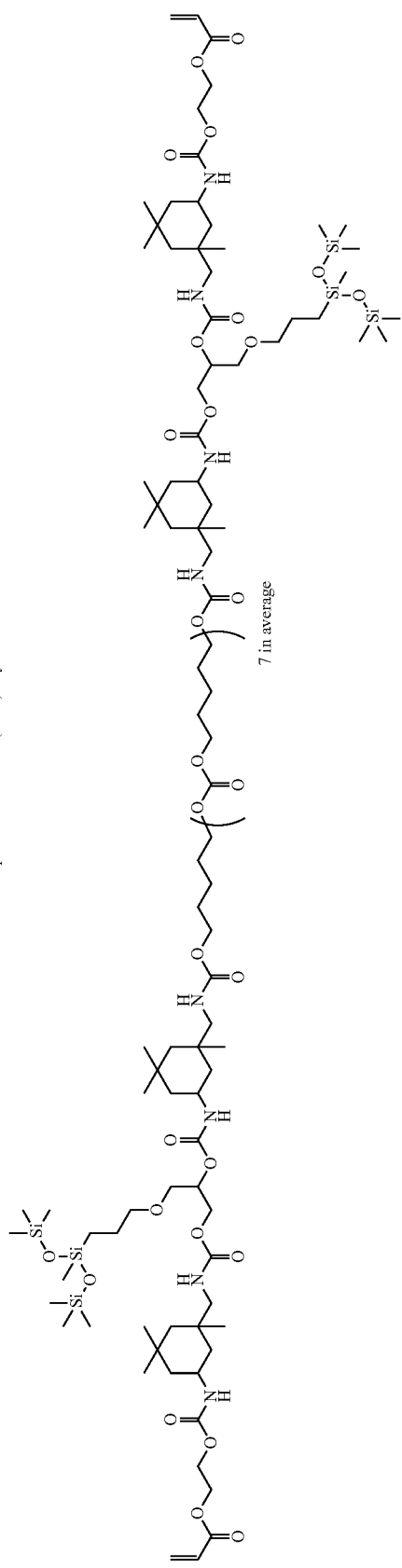
Silicone-pendant urethane-(meth)acrylate-6
7 in average

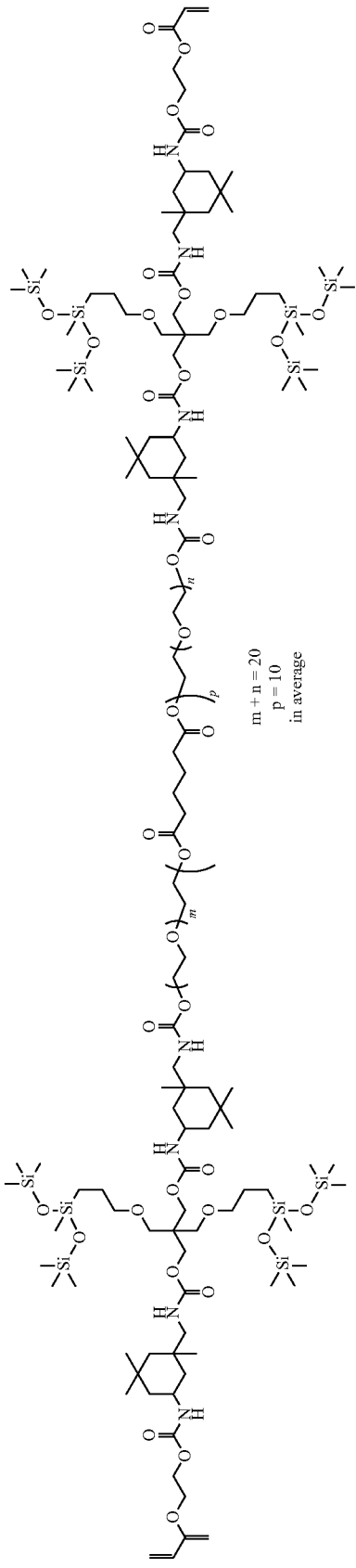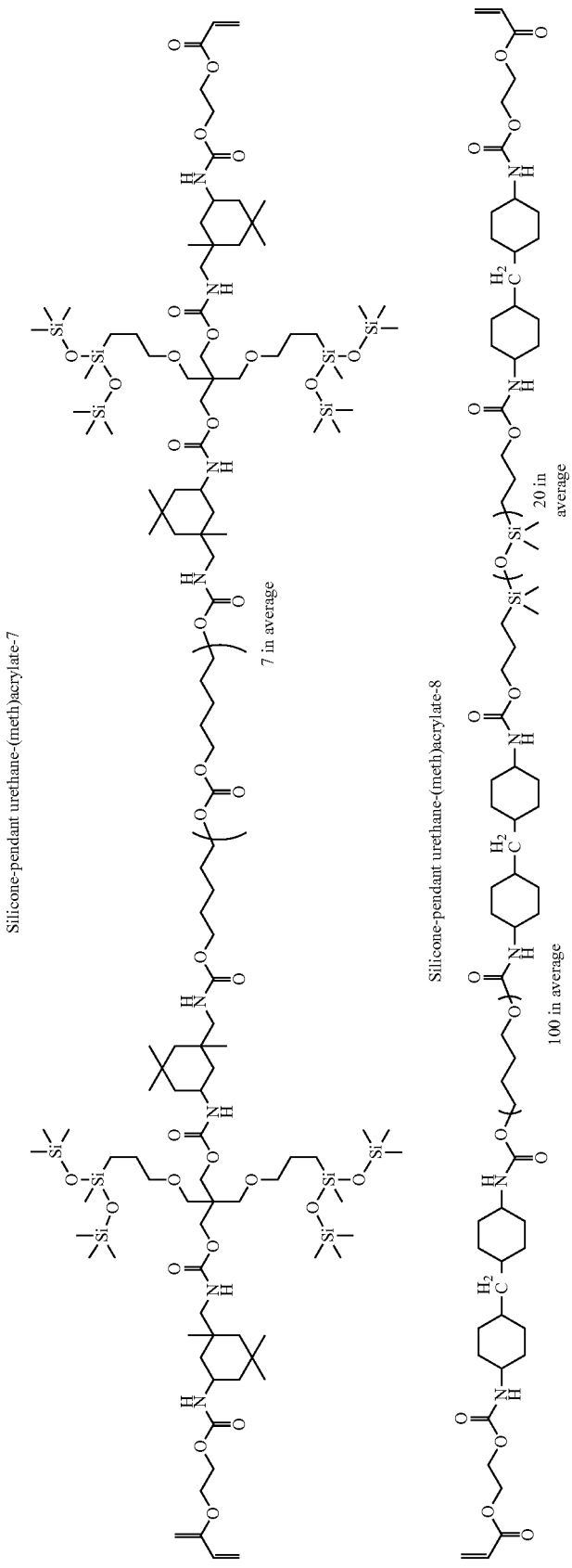

-continued

Silicone urethane-(meth)acrylate-2 m + n = 20
p = 10
in average

Silicone urethane-(meth)acrylate-3

7 in average

Silicone urethane-(meth)acrylate-4

50 in average

Silicone urethane-(meth)acrylate-5

The following are Photo-radical generators-1 to 3 blended to compositions for forming a stretchable film as an additive.
Photo-radical generator-1: diphenyl(2,4,6-trimethylbenzoyl)phosphine oxide
Photo-radical generator-2: 2,2-dimethoxy-2-phenylacetophenone
Photo-radical generator-3: (±)-camphorquinone The following is an organic solvent blended to compositions for forming a stretchable film.
Organic solvent: propylene glycol monomethyl ether acetate (PGMEA)

The following is a monomer having an alkyl group or an aryl group blended to compositions for forming a stretchable film.
Monomer having an alkyl group or an aryl group: isobornyl acrylate Examples and Comparative Examples Each composition for forming a stretchable film (Stretchable film compositions 1-1 to 1-12, Comparative stretchable film compositions 1 and 2) was prepared by mixing a silicone-urethane compound having (meth)acrylate groups at the terminals, Photo-radical generator-1 to 3, and an organic solvent, which was mixed optionally, in the composition described in Table 1.

TABLE 1

| Stretchable film composition | Silicone urethane-(meth)acrylate (parts by mass) | Additive (parts by mass) | Organic solvent (parts by mass) |
|---|---|---|---|
| Stretchable film composition 1 | Silicone-pendant urethane-(meth)acrylate-1 (90)<br>Silicone urethane-(meth)acrylate-1 (10) | Photo-radical generator-1 (1)<br>Isobornyl acrylate (30) | — |
| Stretchable film composition 2 | Silicone-pendant urethane-(meth)acrylate-2 (85)<br>Silicone urethane-(meth)acrylate-1 (15) | Photo-radical generator-2 (2)<br>Isobornyl acrylate (30) | — |
| Stretchable film composition 3 | Silicone-pendant urethane-(meth)acrylate-3 (93)<br>Silicone urethane-(meth)acrylate-5 (7) | Photo-radical generator-3 (3)<br>Isobornyl acrylate (30) | — |
| Stretchable film composition 4 | Silicone-pendant urethane-(meth)acrylate-4 (92)<br>Silicone urethane-(meth)acrylate-5 (8) | Photo-radical generator-3 (3)<br>Isobornyl acrylate (30) | — |
| Stretchable film composition 5 | Silicone-pendant urethane-(meth)acrylate-1 (50)<br>Silicone-pendant urethane-(meth)acrylate-5 (30)<br>Silicone urethane-(meth)acrylate-2 (20) | Photo-radical generator-3 (3)<br>Isobornyl acrylate (20) | — |
| Stretchable film composition 6 | Silicone-pendant urethane-(meth)acrylate-1 (70)<br>Silicone-pendant urethane-(meth)acrylate-6 (15)<br>Silicone urethane-(meth)acrylate-2 (15) | Photo-radical generator-1 (1)<br>Isobornyl acrylate (20) | — |
| Stretchable film composition 7 | Silicone-pendant urethane-(meth)acrylate-1 (60)<br>Silicone-pendant urethane-(meth)acrylate-7 (30)<br>Silicone urethane-(meth)acrylate-5 (10) | Photo-radical generator-3 (3)<br>Isobornyl acrylate (20) | — |
| Stretchable film composition 8 | Silicone-pendant urethane-(meth)acrylate-1 (70)<br>Silicone-pendant urethane-(meth)acrylate-8 (20)<br>Silicone urethane-(meth)acrylate-5 (10) | Photo-radical generator-1 (1)<br>Isobornyl acrylate (20) | — |
| Stretchable film composition 9 | Silicone-pendant urethane-(meth)acrylate-1 (95)<br>Silicone urethane-(meth)acrylate-3 (5) | Photo-radical generator-1 (1)<br>Isobornyl acrylate (30) | — |
| Stretchable film composition 10 | Silicone-pendant urethane-(meth)acrylate-1 (96)<br>Silicone urethane-(meth)acrylate-4 (4) | Photo-radical generator-1 (1)<br>Isobornyl acrylate (30) | — |
| Stretchable film composition 11 | Silicone-pendant urethane-(meth)acrylate-1 (70)<br>Silicone-pendant urethane-(meth)acrylate-8 (20)<br>Silicone urethane-(meth)acrylate-4 (5)<br>Silicone urethane-(meth)acrylate-5 (5) | Photo-radical generator-1 (1)<br>Isobornyl acrylate (20) | — |
| Stretchable film composition 12 | Silicone-pendant urethane-(meth)acrylate-1 (90)<br>Silicone urethane-(meth)acrylate-1 (10) | Photo-radical generator-1 (1)<br>Isobornyl acrylate (30) | PGMEA (50) |
| Comparative stretchable film composition 1 | Silicone-pendant urethane-(meth)acrylate-1 (100) | Photo-radical generator-3 (3)<br>Isobornyl acrylate (30) | — |
| Comparative stretchable film composition 2 | Silicone urethane-(meth)acrylate-1 (100) | Photo-radical generator-1 (1)<br>Isobornyl acrylate (30) | — |

(Preparation of Stretchable Film)

Each of Stretchable film compositions 1 to 12 and Comparative stretchable film compositions 1 and 2 was applied onto a polyethylene substrate by bar coating method, and baked at 100° C. for 5 minutes to form a stretchable film on the substrate. Subsequently, this was irradiated with 500 mJ/cm$^2$ of light with a 1,000 W xenon lamp in a nitrogen atmosphere to cure the stretchable film.

(Measurement of Film Thickness, Contact Angle, Stretching Property, and Strength)

Each of the cured stretchable films (Examples 1 to 12, Comparative examples 1 and 2) was measured for film thickness and contact angle with water on the surface thereof, and were subjected to examination by touching to determine the tackiness. After measuring the contact angle with water on the surface of the stretchable film, the stretchable film was peeled from the substrate, and subjected to measurement of the stretching property (elongation) and strength in conformity to JIS K 6251. The results are shown in Table 2.

TABLE 2

|  | Stretchable film composition | Film thickness (μm) | Contact angle (°) | Elongation (%) | Strength (MPa) | Surface tackiness |
|---|---|---|---|---|---|---|
| Example 1 | Stretchable film composition 1 | 330 | 104 | 390 | 14.1 | none |
| Example 2 | Stretchable film composition 2 | 340 | 103 | 410 | 15.3 | none |
| Example 3 | Stretchable film composition 3 | 300 | 108 | 370 | 12.3 | none |
| Example 4 | Stretchable film composition 4 | 316 | 108 | 350 | 12.1 | none |
| Example 5 | Stretchable film composition 5 | 340 | 104 | 330 | 17.0 | none |
| Example 6 | Stretchable film composition 6 | 390 | 104 | 300 | 19.5 | none |
| Example 7 | Stretchable film composition 7 | 330 | 105 | 370 | 13.3 | none |
| Example 8 | Stretchable film composition 8 | 350 | 104 | 320 | 14.1 | none |
| Example 9 | Stretchable film composition 9 | 360 | 104 | 330 | 15.0 | none |
| Example 10 | Stretchable film composition 10 | 355 | 103 | 300 | 15.2 | none |
| Example 11 | Stretchable film composition 11 | 372 | 105 | 330 | 16.2 | none |
| Example 12 | Stretchable film composition 12 | 250 | 103 | 370 | 14.0 | none |
| Comparative Example 1 | Comparative stretchable film composition 1 | 290 | 94 | 390 | 14.2 | exist |
| Comparative Example 2 | Comparative stretchable film composition 2 | 330 | 103 | 410 | 7.2 | none |

As shown in Table 2, the inventive stretchable films gave higher water repellency, strength, and stretchability, together with lower surface tackiness.

On the other hand, the film of a single silicone-pendant urethane material of Comparative Example 1 showed higher water repellency, strength, and stretchability, but the property was such that the films were stuck with each other due to the surface tackiness; and the film of a single silicone main-chain type urethane material of Comparative Example 2 was free from surface tackiness, but showed inferior strength.

From the above, it was revealed that the inventive stretchable film has excellent stretching property and strength, together with excellent water repellency and low tackiness on the film surface, and has excellent properties as a film that is capable of printing stretchable wiring and coating stretchable wiring or a device used for a wearable device and so on thereby.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A stretchable film composition comprising:

a silicone main-chain type urethane having a structure shown by the following general formula (1)-1 and/or (1)-2, and a silicone-pendant type urethane having a structure shown by the following general formula (2)-1 and/or (2)-2:

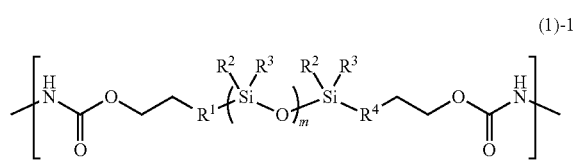
(1)-1

-continued

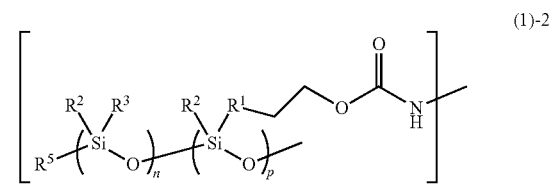
(1)-2

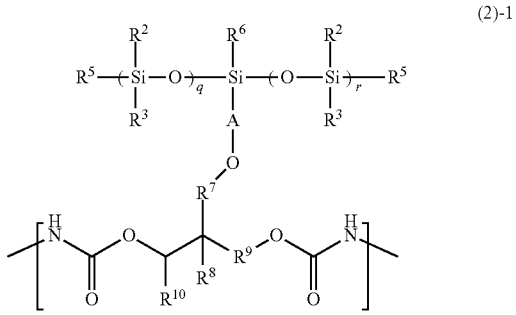
(2)-1

-continued (2)-2

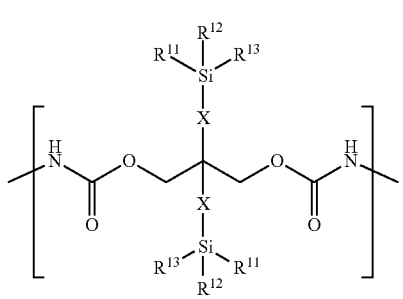

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a —$(OSiR^2R^3)_s$—$OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

2. The stretchable film composition according to claim 1, wherein the silicone main-chain type urethane has a structure containing a (meth)acrylate group at a terminal thereof shown by the following general formula (3)-1 and/or (3)-2:

(3)-1

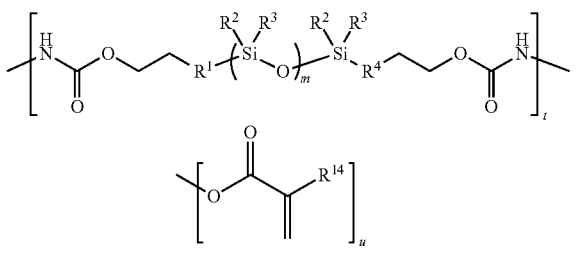

(3)-2

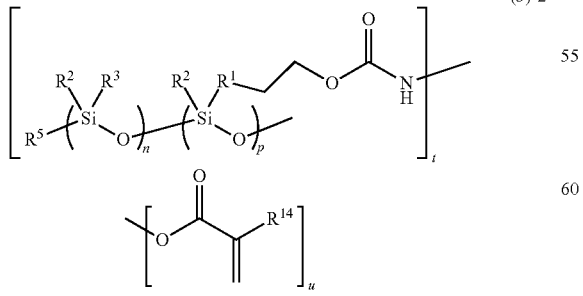

wherein $R^1$ to $R^5$, "m", "n", and "p" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

3. The stretchable film composition according to claim 1, wherein the silicone-pendant type urethane has a structure containing a (meth)acrylate group at a terminal thereof shown by the following general formula (4)-1 and/or (4)-2:

(4)-1

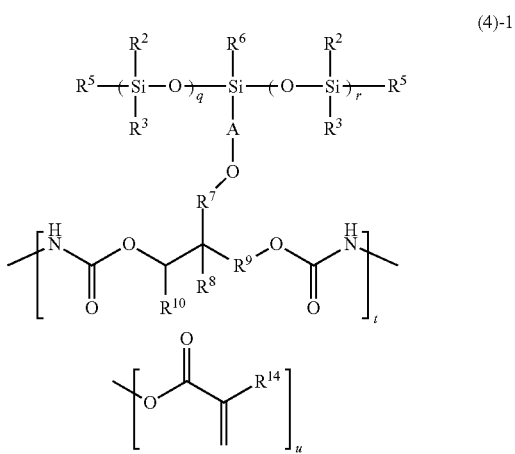

(4)-2

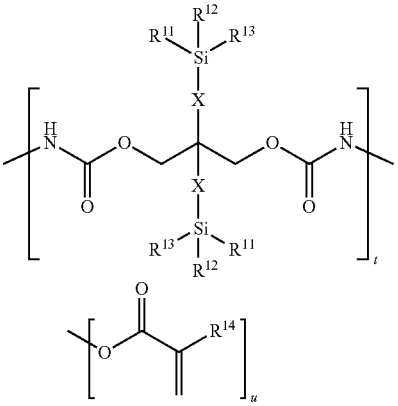

wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

4. The stretchable film composition according to claim 2, wherein the silicone-pendant type urethane has a structure containing a (meth)acrylate group at a terminal thereof shown by the following general formula (4)-1 and/or (4)-2:

(4)-1

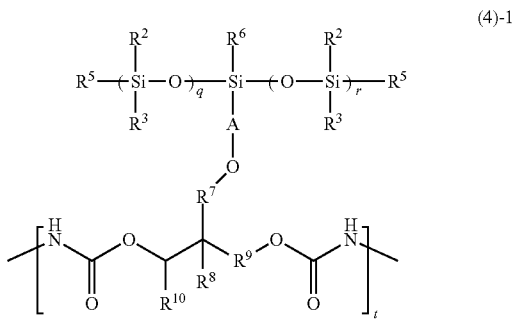

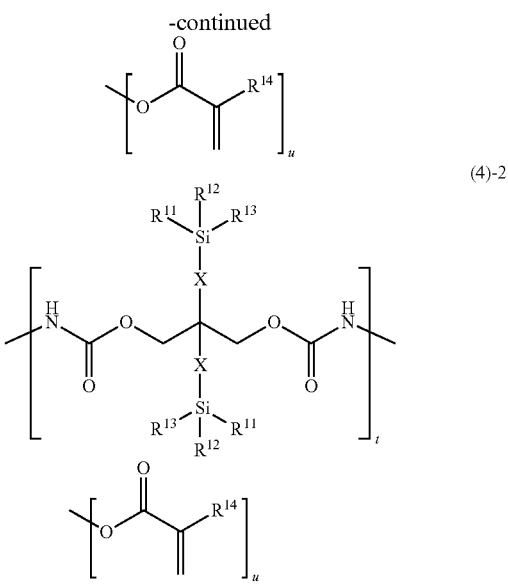

(4)-2 wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

5. The stretchable film composition according to claim 1, wherein the silicone main-chain type urethane is contained in a ratio of 50 mass % or less based on the silicone-pendant type urethane.

6. The stretchable film composition according to claim 5, wherein the silicone main-chain type urethane is contained in a ratio of 25 mass % or less based on the silicone-pendant type urethane.

7. The stretchable film composition according to claim 6, wherein the silicone main-chain type urethane is contained in a ratio of 15 mass % or less based on the silicone-pendant type urethane.

8. A stretchable film comprising a cured material of the stretchable film composition according to claim 1, wherein the silicone main-chain type urethane is oriented to a surface of the stretchable film.

9. A stretchable film comprising a cured material of the stretchable film composition according to claim 2, wherein the silicone main-chain type urethane is oriented to a surface of the stretchable film.

10. A stretchable film comprising a cured material of the stretchable film composition according to claim 3, wherein the silicone main-chain type urethane is oriented to a surface of the stretchable film.

11. A stretchable film comprising a cured material of the stretchable film composition according to claim 4, wherein the silicone main-chain type urethane is oriented to a surface of the stretchable film.

12. A stretchable film comprising a cured material of the stretchable film composition according to claim 5, wherein the silicone main-chain type urethane is oriented to a surface of the stretchable film.

13. The stretchable film according to claim 8, wherein the stretchable film has a stretching property of 20 to 1000% in a tensile test regulated by JIS K 6251.

14. The stretchable film according to claim 8, wherein the stretchable film is used as a film to be in contact with a conductive wiring having stretchability.

15. A method for forming a stretchable film comprising:
forming a film from the stretchable film composition according to claim 1, and then,
curing the film by heating and/or light exposure.

16. A method for forming a stretchable film comprising:
forming a film from the stretchable film composition according to claim 2, and then,
curing the film by heating and/or light exposure.

17. A method for forming a stretchable film comprising:
forming a film from the stretchable film composition according to claim 3, and then,
curing the film by heating and/or light exposure.

18. A method for forming a stretchable film comprising:
forming a film from the stretchable film composition according to claim 4, and then,
curing the film by heating and/or light exposure.

19. A method for forming a stretchable film comprising:
forming a film from the stretchable film composition according to claim 5, and then,
curing the film by heating and/or light exposure.

* * * * *